US012377663B2

(12) United States Patent
Sakai et al.

(10) Patent No.: US 12,377,663 B2
(45) Date of Patent: Aug. 5, 2025

(54) RECORDING DEVICE, RECORDING SYSTEM, AND RECORDING METHOD FOR RECORDING USING CURABLE INK

(71) Applicant: SEIKO EPSON CORPORATION, Tokyo (JP)

(72) Inventors: Hiroshi Sakai, Nagano (JP); Kazuya Toshima, Nagano (JP); Masakazu Okajima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 220 days.

(21) Appl. No.: 18/171,699

(22) Filed: Feb. 21, 2023

(65) Prior Publication Data

US 2023/0264489 A1 Aug. 24, 2023

(30) Foreign Application Priority Data

Feb. 22, 2022 (JP) ................................ 2022-025222

(51) Int. Cl.

| | |
|---|---|
| ***B41J 11/00*** | (2006.01) |
| ***B41J 2/045*** | (2006.01) |
| ***B41J 2/14*** | (2006.01) |
| ***B41J 25/00*** | (2006.01) |

(52) U.S. Cl.

CPC ....... *B41J 11/00212* (2021.01); *B41J 2/0456* (2013.01); *B41J 11/00214* (2021.01); *B41J 11/00218* (2021.01); *B41J 25/001* (2013.01); *B41J 2002/14362* (2013.01)

(58) Field of Classification Search

CPC ................ B41J 11/00212; B41J 2/0456; B41J 11/00214; B41J 11/00218; B41J 25/001; B41J 2002/14362; B41J 19/142; B41J 2/2132

See application file for complete search history.

(56) References Cited

U.S. PATENT DOCUMENTS

| | | | | |
|---|---|---|---|---|
| 2007/0153074 | A1* | 7/2007 | Anderson | B41J 11/0021 347/102 |
| 2017/0072706 | A1* | 3/2017 | Okawa | B41J 2/01 |
| 2017/0088736 | A1 | 3/2017 | Tabayashi | |

FOREIGN PATENT DOCUMENTS

| | | |
|---|---|---|
| WO | 2015/174510 A1 | 11/2015 |

* cited by examiner

*Primary Examiner* — Bradley W Thies

(74) *Attorney, Agent, or Firm* — Global IP Counselors, LLP

(57) ABSTRACT

A recording device includes a recording head including a nozzle row configured to discharge ink droplets that are to be cured when irradiated with light onto a recording medium, a drive unit configured to cause the recording head and the recording medium to move relative to each other, a plurality of irradiation parts configured to irradiate the recording medium with the light, a reception unit configured to receive an input of irradiation range data indicating an irradiation range of the light, and a control unit configured to control turning ON and OFF of the plurality of irradiation parts, to irradiate the recording medium with the light in accordance with the irradiation range, based on the irradiation range data.

9 Claims, 11 Drawing Sheets

RECORDING DEVICE, RECORDING SYSTEM, AND RECORDING METHOD FOR RECORDING USING CURABLE INK

The present application is based on, and claims priority from JP Application Serial Number 2022-025222, filed Feb. 22, 2022, the disclosure of which is hereby incorporated by reference herein in its entirety.

BACKGROUND

1. Technical Field

The present disclosure relates to a recording device, a recording system, and a recording method with which a dot pattern is formed on a recording medium using photocurable ink.

2. Related Art

An inkjet printer has been known that discharges ultraviolet curable ink known as UV ink from a nozzle row of a recording head onto a recording medium. The inkjet printer of this type includes an illuminator that irradiates the recording medium to which the UV ink adheres, with an ultraviolet ray.

WO 2015/174510 discloses an ink jet printing apparatus including a UV LED unit that temporarily cures the UV ink having landed on the recording medium and then fully cures the UV ink. The above-described UV LED unit irradiates the recording medium with the ultraviolet ray with light intensity of 20 mJ/cm$^2$ in a forward path for a movement in a scanning direction, and then irradiates the recording medium with the ultraviolet ray with light intensity of 200 mJ/cm$^2$ in a return path for a movement in a direction opposite to the scanning direction.

The ink jet printing apparatus described above irradiates the recording medium with the ultraviolet ray with uniform light intensity for temporarily curing the UV ink, and then irradiates the recording medium with the ultraviolet ray with uniform light intensity for fully curing the UV ink. Thus, a portion of the recording medium on which no UV ink has landed is irradiated with the ultraviolet ray.

SUMMARY

A recording device according to an aspect of the present disclosure includes

- a recording head including a nozzle row configured to discharge ink droplets that are to be cured when irradiated with light onto a recording medium,
- a drive unit configured to cause the recording head and the recording medium to move relative to each other,
- a plurality of irradiation parts configured to irradiate the recording medium with the light,
- a reception unit configured to receive an input of irradiation range data indicating an irradiation range of the light, and
- a control unit configured to control turning ON and OFF of the plurality of irradiation parts, to irradiate the recording medium with the light in accordance with the irradiation range, based on the irradiation range data.

A recording system according to an aspect of the present disclosure includes the recording device and a host device configured to output the irradiation range data to the reception unit.

A recording method according to an aspect of the present disclosure uses a recording head including a nozzle row configured to discharge ink droplets that are to be cured when irradiated with light onto a recording medium, a drive unit configured to cause the recording head and the recording medium to move relative to each other, and a plurality of irradiation parts configured to irradiate the recording medium with the light, the recording method including

- receiving an input of irradiation range data indicating an irradiation range of the light, and
- turning ON and OFF the plurality of irradiation parts, to irradiate the recording medium with the light in accordance with the irradiation range, based on the irradiation range data.

DESCRIPTION OF EXEMPLARY EMBODIMENTS

Figure 1:
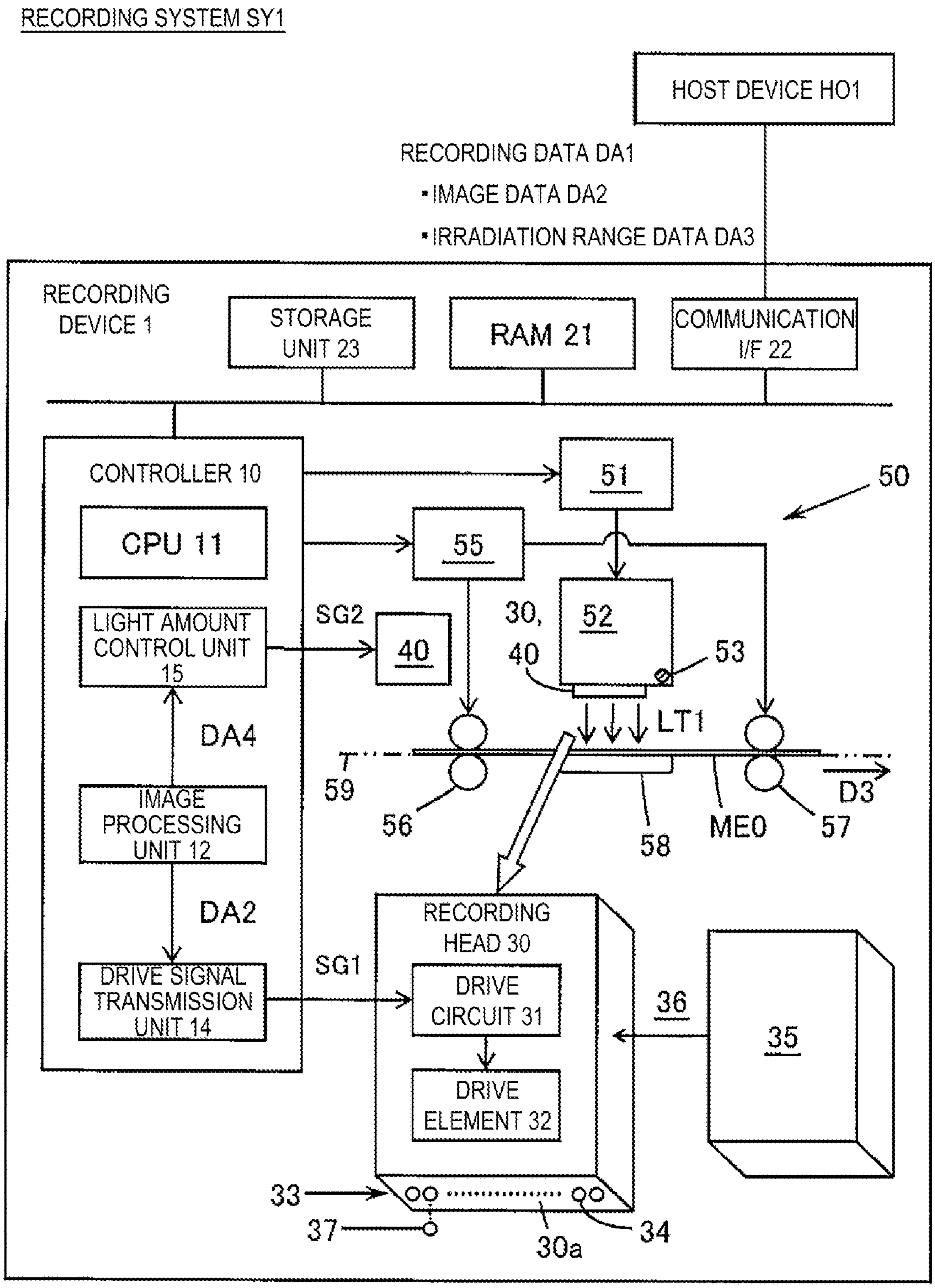
FIG. 1 is a schematic view of an example of a recording system including a recording device and a host device.

Exemplary embodiments of the invention will be described. Of course, the following exemplary embodiments only illustrate the invention, and not all features illustrated in the exemplary embodiments are indispensable for the solution of the invention.

(1) Overview of Technique Included in Present Disclosure

First of all, an overview of technique included in the present disclosure will be described with reference to examples illustrated in FIG. 1 to FIG. 11. Note that the drawings of the present application schematically illustrate the examples, that an enlargement factor in each direction illustrated in each drawing may vary among the drawings, and that the drawings may not be consistent with one another. Of course, the elements of the technique are not limited to specific examples illustrated with reference numerals. Note that in the section "Overview of Technique 142 Included in Present Disclosure", a word included in parentheses is for supplementary description of the immediately preceding word.

Aspect 1

Figure 2:
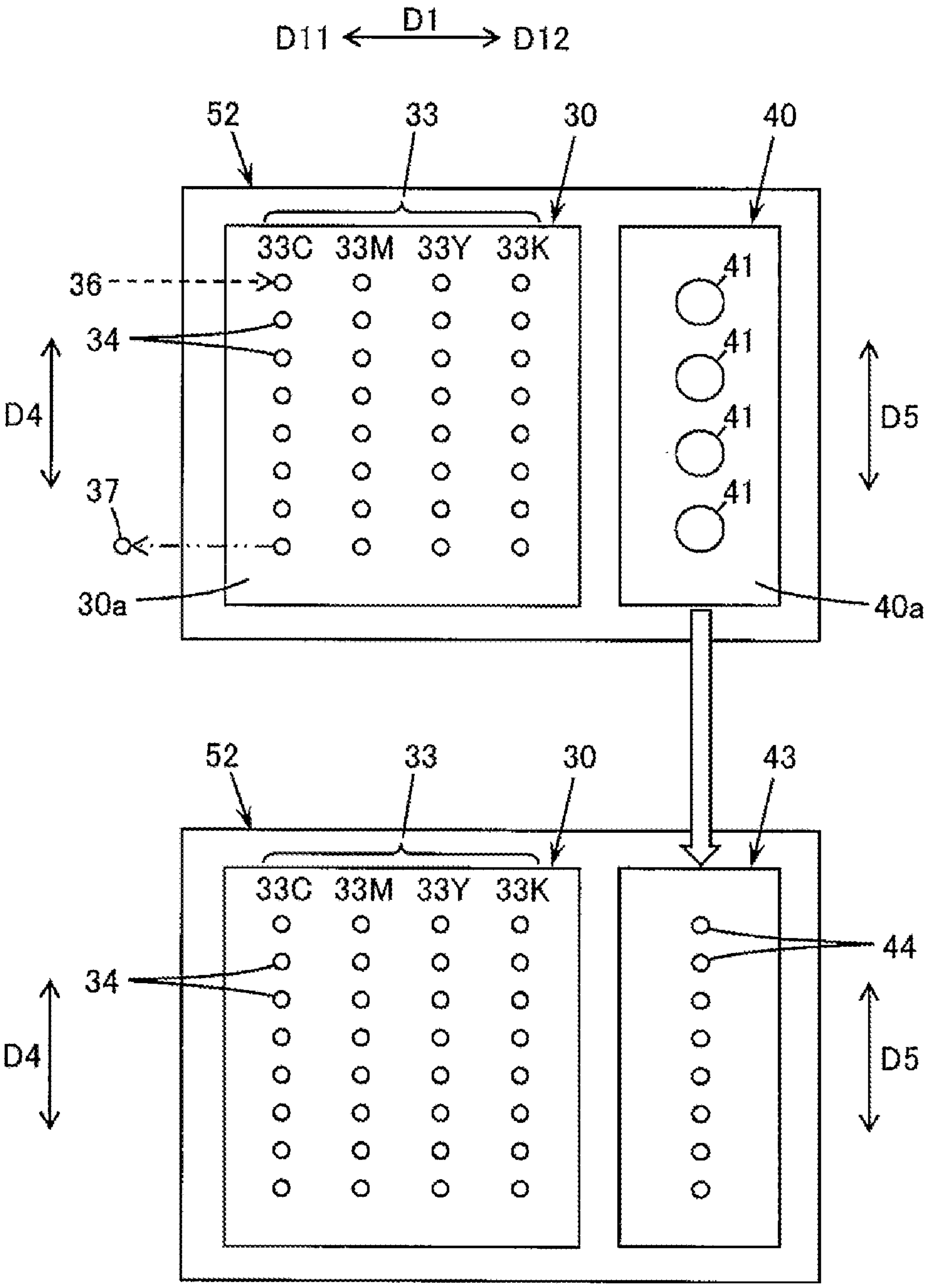
FIG. 2 is a diagram schematically illustrating an example of a nozzle surface of a recording head and a light-emitting surface of an irradiation unit, together with a virtual nozzle row.
Figure 3:
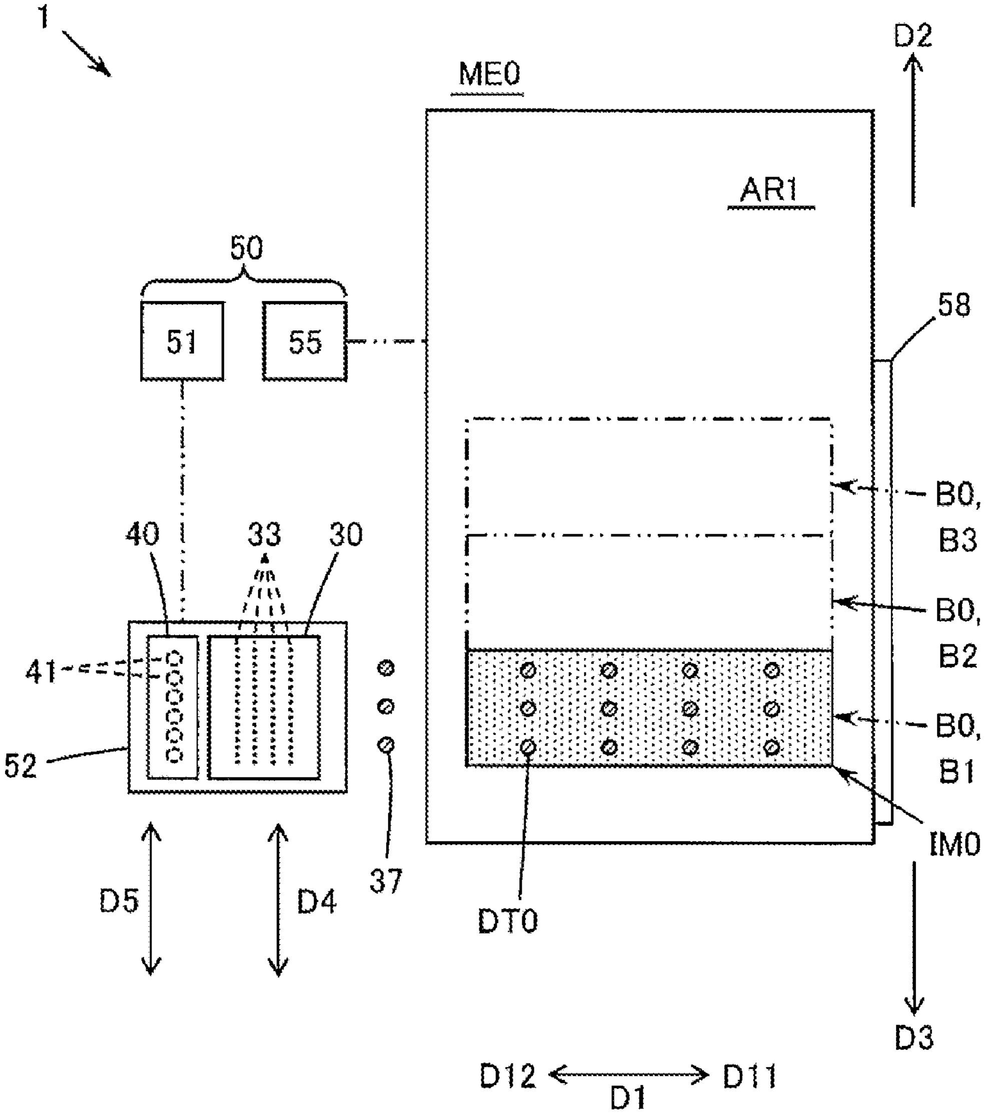
FIG. 3 is a plan view schematically illustrating an example of an operation of the recording device.

A recording device 1 according to an aspect of the present technique includes a recording head 30, a drive unit 50, a plurality of irradiation parts 41, a reception unit (for example, communication I/F 22), and a control unit (for example, a controller 10) as illustrated as an example in FIG. 1 to FIG. 3. The recording head 30 includes a nozzle row 33 that discharges ink droplets 37 to be cured when irradiated with light LT1, onto a recording medium ME0. The drive unit 50 makes the recording head 30 and the recording medium ME0 move relative to each other. The plurality of irradiation parts 41 irradiate the recording medium ME0 with the light LT1. The reception unit (22) receives an input of irradiation range data DA3 indicating an irradiation range AR0 of the light LT1. The control unit (10) controls turning ON and OFF of the plurality of irradiation parts 41, to irradiate the recording medium ME0 with the light LT1 in accordance with the irradiation range AR0, based on the irradiation range data DA3.

In the above-described aspect, the recording medium ME0 is irradiated with the light LT1 in accordance with the irradiation range AR0, with the plurality of irradiation parts 41 turned ON and OFF based on the irradiation range data DA3 indicating the irradiation range AR0 of the light LT1. Thus, the aspect described above can provide a recording device that can achieve a higher degree of freedom in terms of light irradiation for curing ink droplets.

This light includes an ultraviolet ray abbreviated as UV, visible light, and the like.

The nozzle row is a row of a plurality of nozzles that are each a small hole through which the ink droplets are ejected.

The relative movement between the recording head and the recording medium means a change in relative positional relationship between the recording head and the recording medium. The relative movement between the recording head and the recording medium includes moving the recording head without moving the recording medium, moving the recording medium without moving the recording head, and moving both the recording head and the recording medium.

Note that the description above also applies to the aspects below.

Aspect 2

Figure 6:
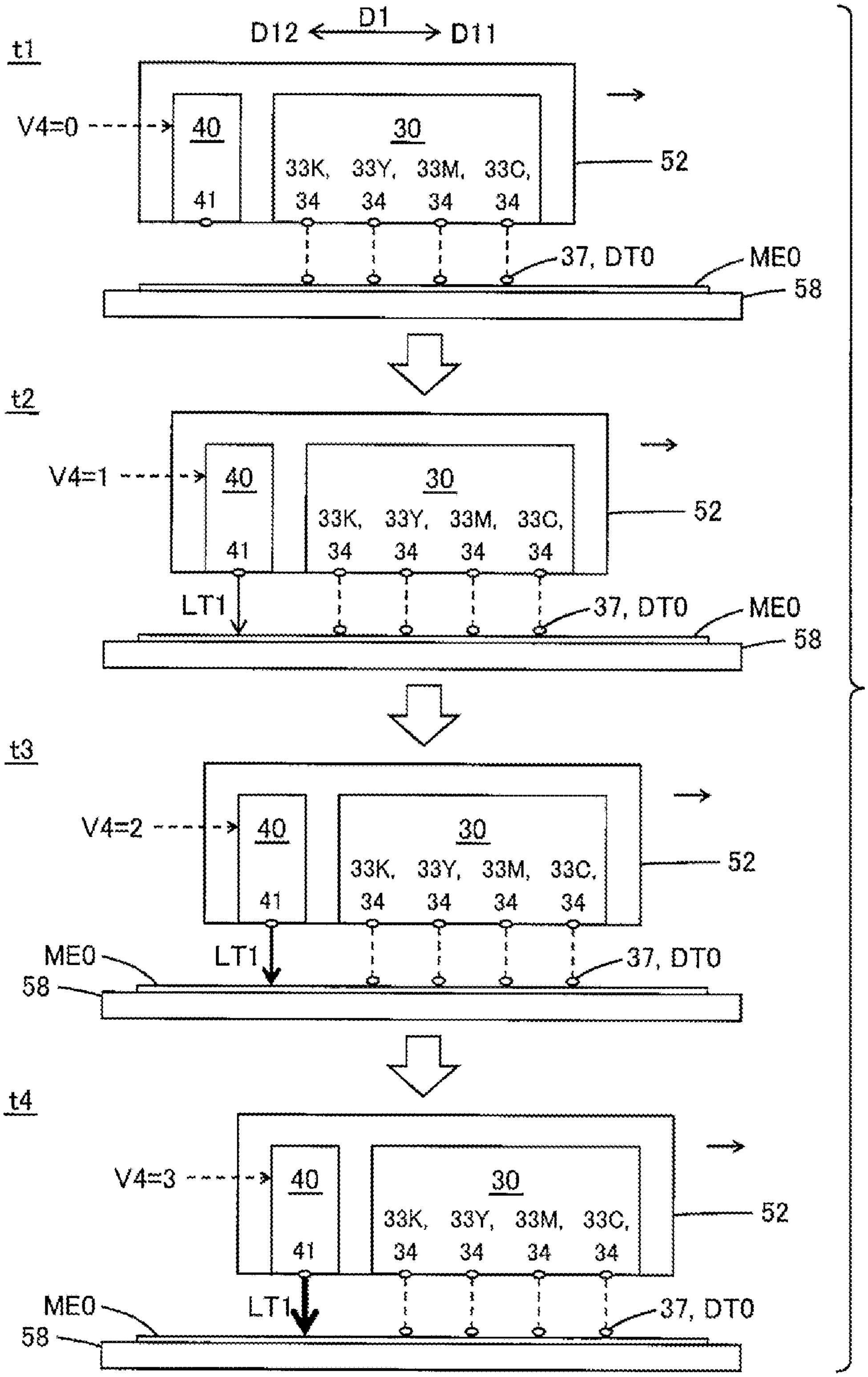
FIG. 6 is a diagram schematically illustrating an example of how an irradiation part is driven.

As illustrated as an example in FIG. 3 and FIG. 6, the drive unit 50 may be configured to cause the plurality of irradiation parts 41 and the recording medium ME0 to move relative to each other in a scanning direction D1 crossing an irradiation part arrangement direction D5 in which the plurality of irradiation parts 41 are arranged. When the plurality of irradiation parts 41 and the recording medium ME0 move relative to each other in the scanning direction D1, the control unit (10) may control an ON timing and an OFF timing of each of the plurality of irradiation parts 41, to irradiate the recording medium ME0 with the light LT1 in accordance with the irradiation range AR0, based on the irradiation range data DA3.

With this configuration, each of the irradiation parts 41 turns ON and OFF at timings based on the irradiation range data DA3, when the plurality of irradiation parts 41 and the recording medium ME0 move relative to each other in the scanning direction D1. Thus, the aspect described above can provide a recording device that can suitably achieve a higher degree of freedom in terms of light irradiation for curing ink droplets.

The relative movement between the plurality of irradiation parts and the recording medium means a change in relative positional relationship between the plurality of irradiation parts and the recording medium. The relative movement between the plurality of irradiation parts and the recording medium includes moving the plurality of irradiation parts without moving the recording medium, moving the recording medium without moving the plurality of irradiation parts, and moving both the plurality of irradiation parts and the recording medium.

Note that the description above also applies to the aspects below.

Aspect 3

As illustrated as an example in FIG. 2, a plurality of nozzles 34 included in the nozzle row 33 may be arranged in a nozzle arrangement direction D4 crossing the scanning direction D1. When the recording head 30 and the recording medium ME0 move relative to each other in the scanning direction D1, the plurality of irradiation parts 41 and the recording medium ME0 may move relative to each other in the scanning direction D1. The present aspect can provide a recording device that can more suitably achieve a higher degree of freedom in terms of light irradiation for curing ink droplets.

Aspect 4

Figure 4:
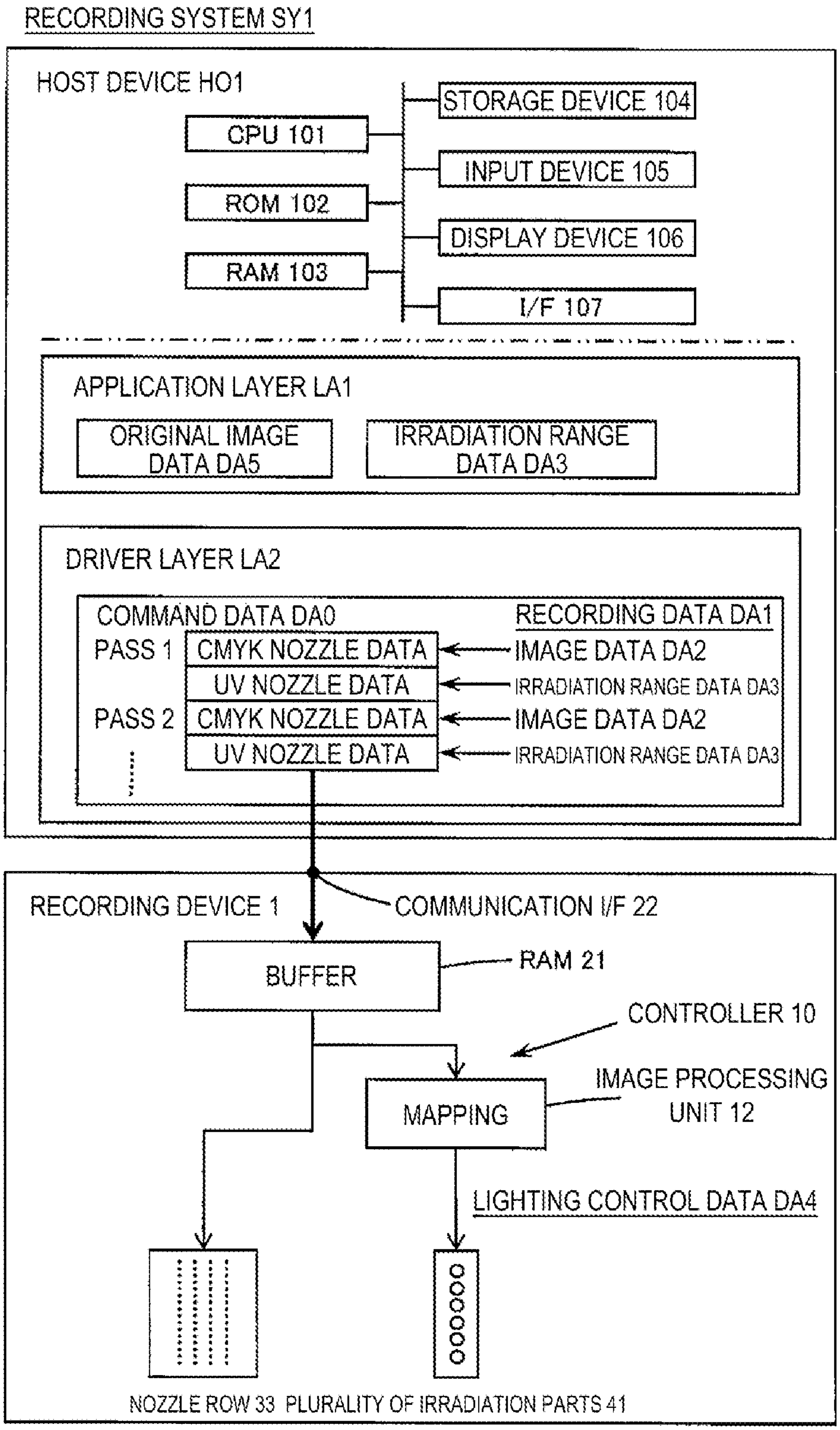
FIG. 4 is a diagram schematically illustrating an example of a data flow in the recording system.

As illustrated as an example in FIG. 4, the reception unit (22) may receive an input of image data DA2 for obtaining a pattern of dots DT0 of the ink droplets 37. As illustrated as an example in FIG. 5, the irradiation range data DA3 may include a plurality of pixels PX1 having the same resolution as the image data DA2, and may include irradiation state information (for example, a pixel value V3) indicating an irradiation state of the light LT1 in units of the pixels PX1. The control unit (10) may control an operation of the drive unit 50 and discharging of the ink droplets 37 by the recording head 30, to form the pattern on the recording medium ME0 based on the image data DA2. The control unit (10) may generate lighting control data DA4 converted from the irradiation range data DA3 in accordance with the arrangement of the plurality of irradiation parts 41, based on the irradiation range data DA3 including the plurality of pixels PX1. The control unit (10) may control turning ON and OFF of the plurality of irradiation parts 41, based on the lighting control data DA4.

With this configuration, the irradiation range data DA3 can be handled based on an existing command system, as in the case of the image data DA2 including the plurality of pixels PX1. Thus, with the above aspect, the irradiation range data can be more easily handled.

The image data may be halftone data indicating a dot formed state for each pixel, or may be a multi-gradation data indicating an amount of ink used for each pixel. The halftone data described above may be binary data indicating whether the dot is formed, or may be multivalued data with a smaller number of gradations than the multi-gradation data, such as four-valued data. The number of gradations of the irradiation range data may be the same as or different from that of the image data. Note that the description above also applies to the aspects below.

Aspect 5

Figure 5:
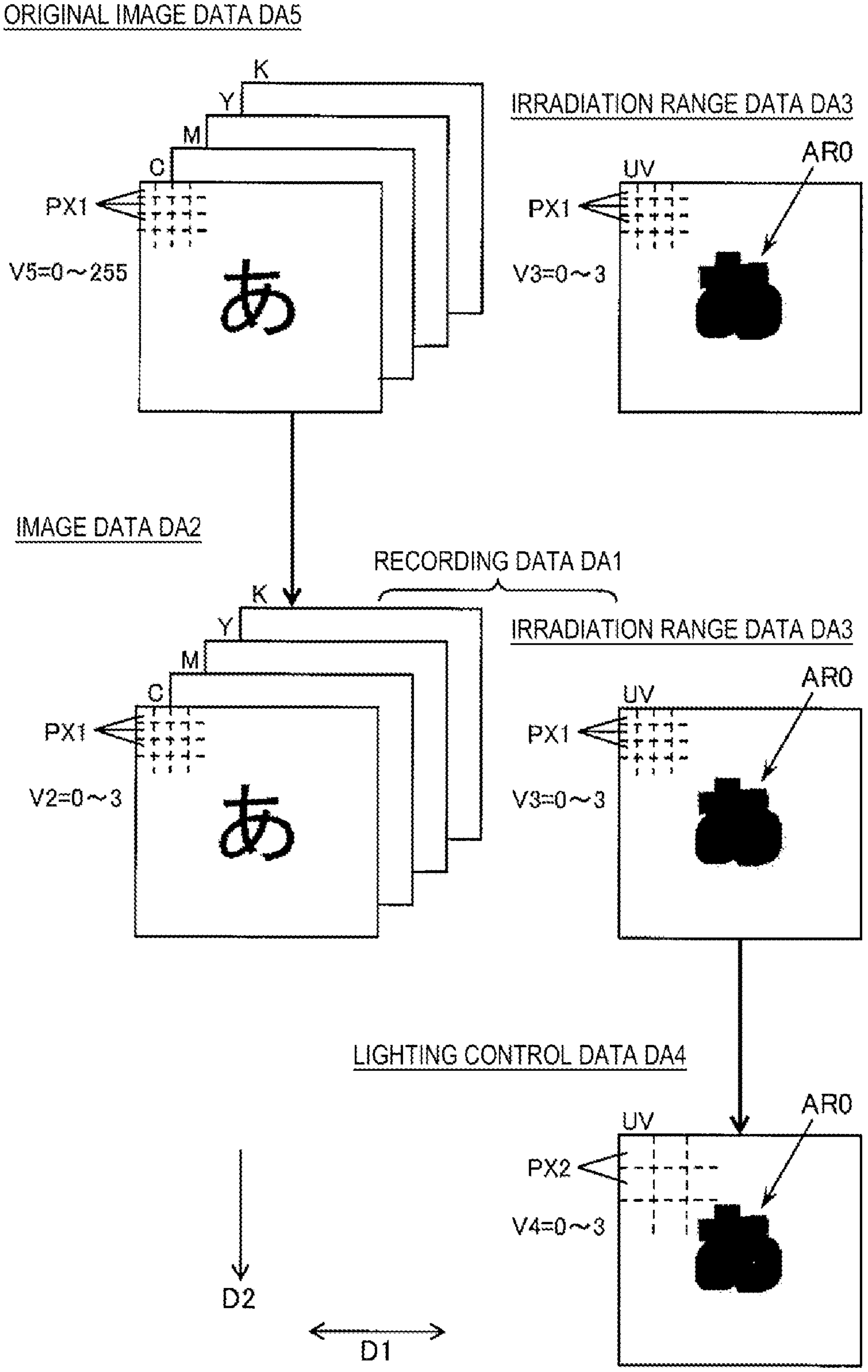
FIG. 5 is a diagram schematically illustrating an example of a structure of various types of data.
Figure 11:
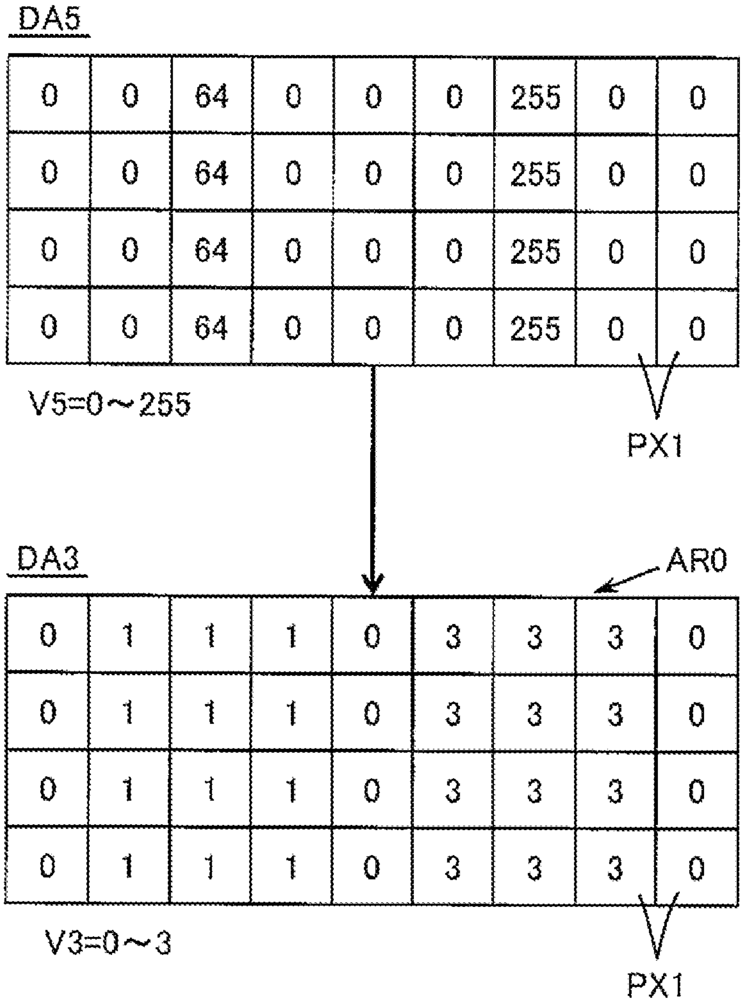
FIG. 11 is a diagram schematically illustrating an example where irradiation intensity is changed in accordance with the amount of ink used.

As illustrated as an example in FIG. 5 and FIG. 11, the irradiation range data DA3 may indicate irradiation intensity (for example, the pixel value V3) of the light LT1 in addition to the irradiation range AR0. The control unit (10) may control the intensity of the light LT1 with which the recording medium ME0 is irradiated by the plurality of irradiation parts 41, based on the irradiation intensity (V3) indicated by the irradiation range data DA3.

In the above case, the light LT1 with which the recording medium ME0 is irradiated by the plurality of irradiation parts 41 has an intensity based on the irradiation intensity (V3) indicated by the irradiation range data DA3. Thus, the aspect described above can provide a recording device that can achieve an even higher degree of freedom in terms of light irradiation for curing ink droplets.

Appendix 6

Figure 9:
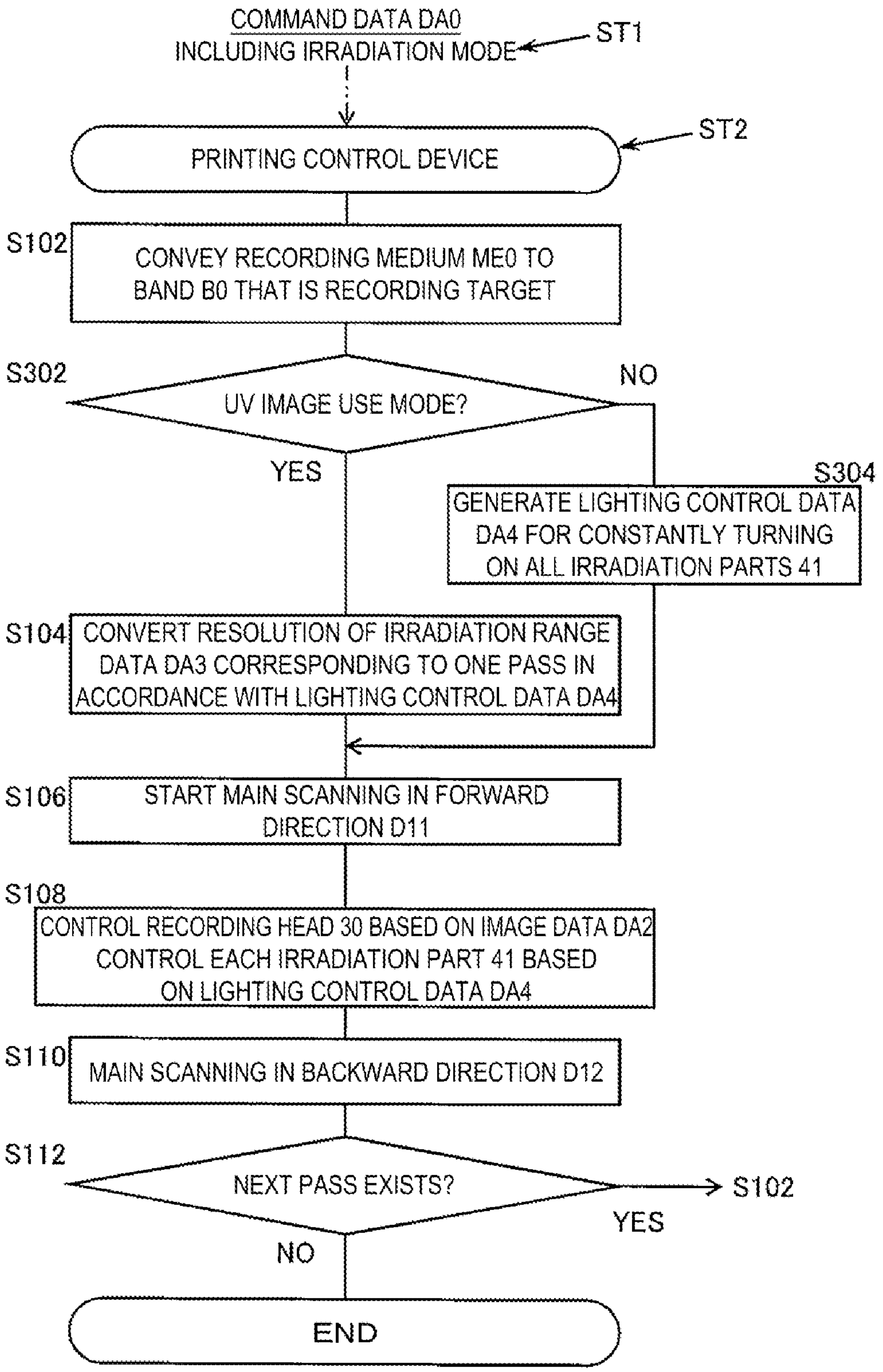
FIG. 9 is a flowchart schematically illustrating another example of the printing control processing.

As illustrated as an example in FIG. 9, the reception unit (22) may receive any one of first setting MD1 with which the plurality of irradiation parts 41 are turned ON and OFF in accordance with the irradiation range AR0, and second setting MD2 with which an entire recording range AR1 of the recording medium ME0 is irradiated with the light LT1. When the first setting MD1 is received, the control unit (10) may control turning ON and OFF of the plurality of irradiation parts 41, to irradiate the recording medium ME0 with the light LT1 in accordance with the irradiation range AR0, based on the irradiation range data DA3. When the second setting MD2 is received, the control unit (10) may perform control to turn ON the plurality of irradiation parts 41, to irradiate the entire recording range AR1 of the recording medium ME0 with the light LT1.

With this configuration, whether the plurality of irradiation parts 41 are turned ON and OFF in accordance with the irradiation range AR0, or the entire recording range AR1 of the recording medium ME0 is irradiated with the light LT1 can be selected. Thus, the aspect described above can provide the recording device with improved usability.

In the present application, “first”, “second”, . . . are terms for distinguishing components included in a plurality of components having similarities, and do not indicate an order. Note that the description above also applies to the aspects below.

Aspect 7

As illustrated as an example in FIG. 1 and FIG. 4, a recording system SY1 according to an aspect of the present technique includes the recording device 1 and a host device HO1 configured to output the irradiation range data DA3 to the reception unit (22). The present aspect can provide a recording system that can achieve a higher degree of freedom in terms of light irradiation for curing ink droplets.

Aspect 8

Figure 8:
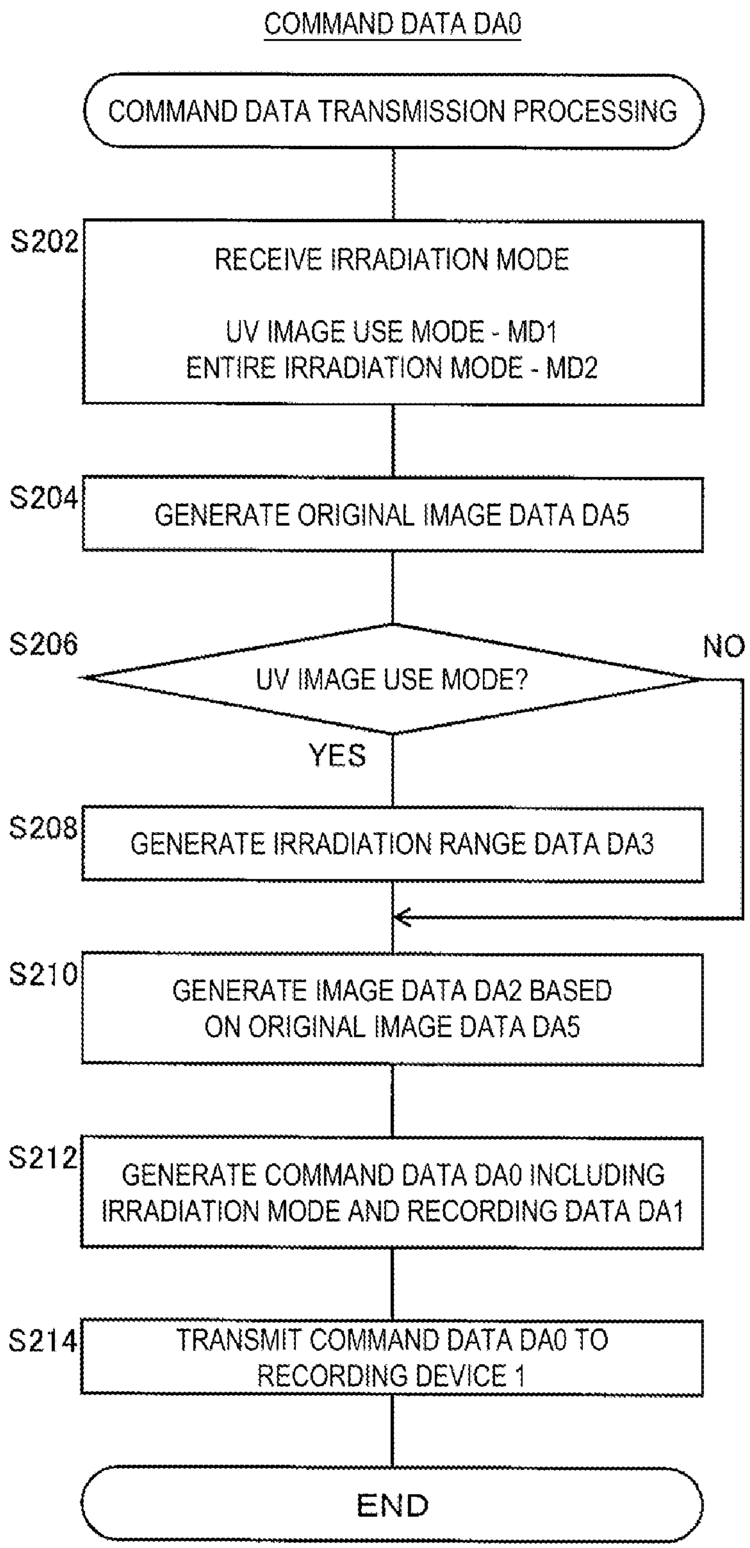
FIG. 8 is a flowchart schematically illustrating an example of command data transmission processing.

As illustrated as an example in FIG. 8, the host device HO1 may acquire original image data DA5 including a plurality of pixels PX1 and indicating an amount of ink used 36 to be the ink droplets 37 in units of the pixels PX1. As illustrated as an example in FIG. 10, the host device HO1 may generate the irradiation range data DA3 with the irradiation range AR0 changed in accordance with the used amount of the ink 36, based on the used amount of the ink 36 expressed in units of the pixels PX1.

With this configuration, the irradiation range AR0 of the light LT1 changes in accordance with the used amount of the ink 36 expressed in units of pixels PX1. Thus, the aspect described above can provide a suitable example for setting the irradiation range AR0 of the light LT1 with the host device HO1.

Aspect 9

As illustrated as an example in FIG. 5 and FIG. 11, the irradiation range data DA3 may include the plurality of pixels PX1 and indicate irradiation intensity (V3) of the light LT1 in units of the pixels PX1 in addition to the irradiation range AR0. The control unit (10) may control the intensity of the light LT1 with which the recording medium ME0 is irradiated by the plurality of irradiation parts 41, based on the irradiation intensity (V3) indicated in units of the pixels PX1 in the irradiation range data DA3. As illustrated as an example in FIG. 8, the host device HO1 may acquire original image data DA5 including the plurality of pixels PX1 and indicating an amount of ink used 36 to be the ink droplets 37 in units of the pixels PX1. As illustrated as an example in FIG. 11, the control unit (10) may generate the irradiation range data DA3 with the irradiation intensity (V3) of the light LT1 changed in accordance with the used amount of the ink 36, based on the used amount of the ink 36 expressed in units of the pixels PX1.

With this configuration, the irradiation intensity (V3) of the light LT1 changes in accordance with the used amount of the ink 36 expressed in units of pixels PX1. Thus, the aspect described above can provide a suitable example for setting the irradiation intensity of the light with the host device.

Aspect 10

A recording method according to an aspect of the present technique is a recording method using the recording head 30, the drive unit 50, and the plurality of irradiation parts 41. The present recording method includes the following steps, as illustrated as an example in FIG. 7 and the like.

(A1) A receiving step ST1 of receiving an input of irradiation range data DA3 indicating an irradiation range AR0 of the light LT1.

(A2) An irradiation step ST2 of turning ON and OFF the plurality of irradiation parts 41, to irradiate the recording medium ME0 with the light LT1 in accordance with the irradiation range AR0, based on the irradiation range data DA3.

The above aspect can provide a recording method that can achieve a higher degree of freedom in terms of light irradiation for curing ink droplets.

The present technique can be further applied to a system including the recording device described above, a method of controlling the system, a control program for the recording device described above, a control program for the system described above, a computer-readable medium recording any of the control programs described above, and the like. The above-described recording device may include a plurality of separate units.

(2) Specific Example of Recording Device

FIG. 1 schematically illustrates an example of the recording system SY1 including the recording device 1 that uses UV ink that is ink cured upon being irradiated with the light LT1. An example of the light LT1 includes an ultraviolet ray abbreviated as UV. The ink is assumed to include a liquid containing no coloring material. The recording system SY1 illustrated in FIG. 1 includes the recording device 1 and the host device HO1. Note that the recording system SY1 may include additional elements not illustrated in FIG. 1, and the recording device 1 may include additional elements not illustrated in FIG. 1. FIG. 2 schematically illustrates examples of a nozzle surface 30*a* of the recording head 30 and a light-emitting surface 40*a* of an irradiation unit 40, together with a UV nozzle row 43. The UV nozzle row 43 means a virtual nozzle row formed by the plurality of irradiation parts 41 of the irradiation unit 40 regarded as a virtual nozzle row. FIG. 3 is a plan view schematically illustrating an example of an operation of the recording device 1. FIG. 4 schematically illustrates an example of a data flow in the recording system SY1. FIG. 5 schematically illustrates an example of structures of various types of data.

The recording device 1 illustrated in FIG. 1 is a serial printer, which is one type of the UV inkjet printer, and includes the controller 10, a RAM 21, the communication I/F 22, a storage unit 23, the recording head 30, the irradiation unit 40, the drive unit 50, and the like. RAM is an abbreviation for Random Access Memory, and I/F is an abbreviation for interface. The controller 10 is an example of the control unit. The communication I/F 22 is an example of the reception unit. The controller 10, the RAM 21, the communication I/F 22, and the storage unit 23 are coupled to a bus and can input/output information to/from each other.

The controller 10 includes a CPU 11, an image processing unit 12, a drive signal transmission unit 14, a light amount control unit 15, and the like. CPU is an abbreviation for Central Processing Unit. The controller 10 controls main scanning and sub scanning by the drive unit 50 and discharging of the ink droplets 37 by the recording head 30 based on the image data DA2 acquired from the host device HO1 through the communication I/F 22. The controller 10 controls turning ON and OFF of the plurality of irradiation parts 41 of the irradiation unit 40 illustrated in FIG. 2 and FIG. 3, based on the lighting control data DA4 converted from the irradiation range data DA3 acquired from the host device HO1 through the communication I/F 22. The controller 10 can be configured by a SoC or the like. SoC is an abbreviation for System on a Chip.

The CPU 11 serves as a core device in performing information processing and control in the recording device 1.

The image processing unit 12 outputs the image data DA2 stored in the RAM 21 serving as a buffer, to the drive signal transmission unit 14. The image data DA2 of the present specific example is assumed to be halftone data representing the formed state of the dots DT0 in units of pixels. The halftone data may be binary data indicating whether a dot is formed, or may be multivalued data for three gradations or more that can indicate dots of different sizes such as small, medium, and large dots. The binary data may be data with 1 meaning that a dot is formed, and 0 meaning that a dot is not formed, for example. The four-valued data two bits of which are usable for expressing each pixel may be data with 3 corresponding to large dot formation, 2 corresponding to medium dot formation, 1 corresponding to small dot formation, and 0 corresponding to no dot, for example.

Note that the image processing unit 12 may include a resolution conversion unit, a color conversion unit, a halftone processing unit, or may generate image data DA2 in the halftone processing unit. In this case, the resolution conversion unit converts the resolution of the input image from the host device HO1 or the like to a set resolution. The input image is, for example, expressed using RGB data having integer values for 28 gradations or 216 gradations of R, G, and B for each pixel. Note that R means red, G means green, and B means blue. The color conversion unit refers to a color conversion look-up table defining, for example, correspondence relationship between the gradation values of R, G, and B and gradation values of C, M, Y, and K, and converts RGB data of the set resolution into ink amount data having integer values of 28 gradations or 216 gradations of C, M, Y, and K for each pixel. Note that C means cyan, M means magenta, Y means yellow, and K means black. The ink amount data indicates the used amount of the ink 36 for each pixel. The halftone processing unit executes predetermined halftone processing, for example, a dither method, an error diffusion method, or a density pattern method, on the gradation value of each pixel forming the ink amount data, to generate the image data DA2 with a reduced number of gradations.

The image processing unit 12 generates the lighting control data DA4 by lowering the resolution of the irradiation range data DA3 stored in the RAM 21 serving as a buffer in accordance with the arrangement of the plurality of irradiation parts 41, and outputs the lighting control data DA4 to the light amount control unit 15. As will be described in detail below, the irradiation range data DA3 has a resolution corresponding to the arrangement of a plurality of UV nozzles 44 included in the virtual UV nozzle row 43, with the irradiation state of the light LT1 expressed in units of pixels. The irradiation range data DA3 may be binary data indicating ON or OFF, or may be multivalued data with three gradations or more that can correspond to turning ON with different irradiation intensities, such as turning ON with high, medium, and low intensities. The binary data may be data with 1 corresponding to ON and 0 corresponding to OFF, for example. Four-valued data two bits of which are usable for expressing each pixel may be employed as data with 3 corresponding to high irradiation intensity, 2 corresponding to medium irradiation intensity, 1 corresponding to low irradiation intensity, and 0 corresponding to OFF, for example.

The drive signal transmission unit 14 uses the image data DA2 to generate a drive signal SG1 corresponding to a voltage signal to be applied to a drive element 32 of the recording head 30, and outputs the drive signal SG1 to a drive circuit 31 of the recording head 30. For example, when the image data DA2 corresponds to "dot formation", the drive signal transmission unit 14 outputs the drive signal SG1 for discharging the ink droplets for forming the dots. When the image data DA2 is the four-valued data, the drive signal transmission unit 14 outputs the drive signal SG1 for discharging the ink droplet for large dots when the image data DA2 corresponds to "large dot formation", outputs the drive signal SG1 for discharging the ink droplet for medium dots when the image data DA2 corresponds to "medium dot formation", and outputs the drive signal SG1 for discharging the ink droplet for small dots when the image data DA2 corresponds to "small dot formation".

The light amount control unit 15 controls turning ON and OFF of each of the irradiation parts 41 included in the irradiation unit 40, and controls the irradiation intensity when the irradiation intensity varies among the irradiation parts 41 being turned ON. For example, when the lighting control data DA4 corresponds to "ON", the light amount control unit 15 outputs a drive signal SG2 for turning ON the irradiation parts 41. When the lighting control data DA4 is four-valued data, the drive signal transmission unit 14 outputs the drive signal SG2 to turn ON the irradiation parts 41 with high irradiation intensity when the lighting control data DA4 corresponds to "high irradiation intensity", outputs the drive signal SG2 to turn ON the irradiation parts 41 with medium irradiation intensity when the lighting control data DA4 corresponds to "medium irradiation intensity", and outputs the drive signal SG2 to turn ON the irradiation parts 41 with low irradiation intensity when the lighting control data DA4 corresponds to "low irradiation intensity".

The components 11 to 15 described above may each be formed by an ASIC that directly reads processing target data from the RAM 21 and directly writes the processed data to the RAM 21. ASIC is an abbreviation for Application Specific Integrated Circuit.

As illustrated in FIG. 1 to FIG. 3, the irradiation unit 40 includes the plurality of irradiation parts 41 arranged along the irradiation part arrangement direction D5, and is mounted on a carriage 52 together with the recording head 30. The carriage 52 moves back and forth along the scanning direction D1. The irradiation part arrangement direction D5 is a direction crossing the scanning direction D1, and is a direction orthogonal to the scanning direction D1, for example. The irradiation part arrangement direction D5 may match a send direction D3 as illustrated in FIG. 3, or may be inclined relative to the send direction D3 within a range of less than 90°. The irradiation parts 41 are disposed in the light-emitting surface 40*a* of the irradiation unit 40 facing a platen 58, and irradiate the recording medium ME0 on the platen 58 with the light LT1 with which the ink droplets 37 are cured. With this configuration, the ink droplets 37 having landed on the recording medium ME0 are cured. The irradiation parts 41 each include a light source emitting the light LT1 from the light-emitting surface 40*a*. The light source of the present specific example is assumed to emit UV with a peak wavelength within a range from 360 to 420 nm, for example, around 395 nm. A light emitting diode (LED) is preferably used as the light source. Still, a metal halide lamp or the like may be used.

The drive unit 50 controlled by the controller 10 includes a carriage drive unit 51 and a roller drive unit 55. In the drive unit 50, the carriage drive unit 51 drives the carriage 52 to move back and forth along the scanning direction D1, and the roller drive unit 55 drives the recording medium ME0 to be sent in the send direction D3 along a conveyance path 59. Thus, the drive unit 50 moves the recording head 30 and the recording medium ME0 relative to each other in the scanning direction D1 for main scanning, and moves the recording head 30 and the recording medium ME0 relative to each other in the send direction D3 for sub scanning. Furthermore, the drive unit 50 moves the plurality of irradiation parts 41 and the recording medium ME0 relative to each other in the scanning direction D1 for main scanning, and moves the plurality of irradiation parts 41 and the recording medium ME0 relative to each other in the send direction D3 for sub scanning. When the recording head 30 and the recording medium ME0 move relative to each other in the scanning direction D1, the plurality of irradiation parts 41 and the recording medium ME0 move relative to each other in the scanning direction D1. The send direction D3 is a direction crossing the scanning direction D1, and is a direction orthogonal to the scanning direction D1, for example. In FIG. 1, the send direction D3 is a direction toward the right side. Thus, the left side and the right side thereof are respectively referred to as an upstream side and a downstream side. Under the control by the controller 10, the carriage drive unit 51 performs the main scanning with the carriage 52 moved in a forward direction D11 and a backward direction D12 opposite to the forward direction D11 along the scanning direction D1 as illustrated in FIG. 3. The scanning direction D1 is a comprehensive term including the forward direction D11 and the backward direction D12. The roller drive unit 55 includes a conveyance roller pair 56 and a sheet discharge roller pair 57. Under the control by the controller 10, the roller drive unit 55 performs sub scanning with the recording medium ME0 sent in the send direction D3, by rotating driving conveyance rollers of the conveyance roller pair 56 and driving sheet discharge rollers of the sheet discharge roller pair 57. The recording medium ME0 is a material holding a printed image thereon, and is formed of paper, resin, metal, or the like. The material of the recording medium ME0 is not particularly limited, and may be various materials such as resin, metal, and paper. The shape of the recording medium ME0 is also not particularly limited, and may be various shapes such as a rectangular shape and a roll shape, and may even be a three-dimensional shape.

The carriage 52 carries the recording head 30 and the irradiation unit 40. The carriage 52 may carry an ink cartridge 35 from which the ink 36 to be discharged as the ink droplets 37 is supplied to the recording head 30. Of course, the ink 36 may be supplied to the recording head 30 through a tube from the ink cartridge 35 disposed outside the carriage 52. The carriage 52 provided with the recording head 30 and the irradiation unit 40 is fixed to an endless belt not illustrated, to be capable of moving in the forward direction D11 and the backward direction D12 along a guide 53. The guide 53 is an elongated member with the longitudinal direction extending along the scanning direction D1. The carriage drive unit 51 is formed by a servomotor, and moves the carriage 52 in the forward direction D11 and the backward direction D12 in accordance with an instruction from the controller 10.

The conveyance roller pair 56 on the upstream side of the recording head 30 sends the recording medium ME0 nipped therebetween toward the recording head 30 through the rotation of the driving conveyance rollers, during the sub scanning. The sheet discharge roller pair 57 on the downstream side of the recording head 30 conveys the recording medium ME0 nipped therebetween toward a sheet discharge tray not illustrated, through the rotation of the driving sheet discharge rollers, during the sub scanning. The roller drive unit 55 is formed by a servomotor, and operates the conveyance roller pair 56 and the sheet discharge roller pair 57 to send the recording medium ME0 in the send direction D3, in accordance with an instruction from the controller 10.

The platen 58 is on the lower side of the conveyance path 59, and supports the recording medium ME0 on the conveyance path 59, by being in contact with the recording medium ME0. The recording head 30 controlled by the controller 10 discharges the ink droplets 37 onto the recording medium ME0 supported by the platen 58. Thus, the ink 36 adheres to the recording medium ME0. The plurality of irradiation parts 41 controlled by the controller 10 irradiate the ink 36 adhering to the recording medium ME0 with the light LT1, to cure the ink 36 adhering to the recording medium ME0.

The recording head 30 includes the nozzle surface 30*a* provided with the plurality of nozzles 34 that discharge the ink droplets 37, and discharges the ink droplets 37 onto the recording medium ME0 on the platen 58, to perform printing. The nozzle surface 30*a* is a surface from which the ink droplets 37 are discharged. The recording head 30 includes the drive circuit 31, the drive element 32, and the like. The drive circuit 31 applies the voltage signal to the drive element 32 in accordance with the drive signal SG1 input from the drive signal transmission unit 14. The drive element 32 may be a piezoelectric element that applies pressure to the ink 36 in the pressure chamber in communication with the nozzles 34, a drive element that produces bubbles in the pressure chamber using heat to discharge the ink droplets 37 from the nozzles 34, and the like. The recording head 30 has a pressure chamber to which the ink 36 is supplied from the ink cartridge 35. A combination of the ink cartridge 35 and the nozzle row 33 is provided for each color of the ink 36. The drive element 32 makes the ink 36 in the pressure chamber discharged as the ink droplets 37 onto the recording medium ME0, from the nozzles 34. As a result, dots of the ink droplets 37 are formed on the recording medium ME0. While the recording head 30 moved in the scanning direction D1, dots corresponding to the image data DA2 are formed, and the sub scanning once during which the recording medium ME0 is sent in the send direction D3 is repeated. Thus, an image IM0 is formed on the recording medium ME0.

The RAM 21 is a volatile mass semiconductor memory, and stores recording data DA1 and the like received from the host device HO1, a memory not illustrated, or the like. As illustrated in FIG. 4 and FIG. 5, the recording data DA1 includes the image data DA2 and the irradiation range data DA3. The communication I/F 22 is coupled to the host device HO1 wirelessly or using a wire, and outputs information to the host device HO1. The communication I/F 22 receiving the recording data DA1 is an example of a reception unit that receives an input of the irradiation range data DA3 indicating the irradiation range AR0 of the light LT1. The host device HO1 includes a computer such as a personal computer and a tablet terminal, a mobile phone such as a smart phone, a digital camera, a digital video camera, and the like. The storage unit 23 stores firmware and the like. The storage unit 23 may be a nonvolatile semiconductor memory such as a flash memory, a magnetic storage device such as a hard disk, or the like.

The recording head 30 illustrated in FIG. 2 includes a plurality of the nozzle rows 33 each including a plurality of nozzles 34 arranged in the nozzle arrangement direction D4 at a predetermined interval, that is, a nozzle pitch, in the nozzle surface 30*a*. Each of the nozzle rows 33 discharges the ink droplets 37 to be cured when irradiated with light LT1, onto the recording medium ME0. The nozzle arrangement direction D4 illustrated in FIG. 3 is orthogonal to the scanning direction D1, but may cross the scanning direction D1 in an inclined manner without being orthogonal thereto. In other words, the nozzle arrangement direction D4 may match the send direction D3 as illustrated in FIG. 3, or may be inclined relative to the send direction D3 within a range of less than 90°. The plurality of nozzles 34 included in each nozzle row 33 may be arranged in a single row, or may be arranged in a staggered manner, that is, in two rows.

The plurality of nozzle rows 33 illustrated in FIG. 2 include a nozzle row 33C for discharging the ink droplets 37 corresponding to the color C, a nozzle row 33M for discharging the ink droplets 37 corresponding to the color M, a nozzle row 33Y for discharging the ink droplets 37 corresponding to the color Y, and a nozzle row 33K for discharging the ink droplets 37 corresponding to the color K. In the nozzle surface 30*a*, the nozzle row 33C, the nozzle row 33M, the nozzle row 33Y, and the nozzle row 33K are arranged in the scanning direction D1.

The ink 36 supplied to each of the nozzles 34 contains a polymerizable compound and a photopolymerization initiator. The ink 36 each corresponding to the colors C, M, Y, and, K contains a color material. Note that a non-colored ink containing no color material can be used as at least a part of the ink 36.

The polymerizable compound polymerizes by the action of the photopolymerization initiator and cures the ink 36. The polymerizable compound may be various types of (meth)acrylate monomers, various types of (meth)acrylate oligomers, various types of vinyl monomers, various types of vinyl ether monomers, and the like, and may be vinyl ether group-containing (meth)acrylic acid esters (referred to as monomer A) represented by the following general formula (1).

$$CH_2{=}CR^1{-}COOR^2{-}O{-}CH{=}CH{-}R^3 \quad (1)$$

In the formula, $R^1$ is a hydrogen atom or a methyl group, $R^2$ is a divalent organic residue having from 2 to 20 carbon atoms, $R^3$ is a hydrogen atom or a monovalent organic residue having from 1 to 11 carbon atoms. The monomer A may be various types of monomers disclosed in JP-A-2014-195889. The content of the polymerizable compound in the ink 36 can be, for example, approximately 60 to 95 mass %.

The photopolymerization initiator initiates the polymerization reaction of the polymerizable compound by irradiation with UV. The photopolymerization initiator may be an alkylphenone-based photopolymerization initiator, an acylphosphine-based photopolymerization initiator, a titanocene-based photopolymerization initiator, a thioxanthone-based photopolymerization initiator, and the like. The content of the photopolymerization initiator in the ink 36 can be, for example, approximately from 9 to 14 mass %.

The color material may be a pigment such as an inorganic pigment or an organic pigment. The inorganic pigment may be carbon black, a metal oxide such as an iron oxide and a titanium oxide, and the like. The organic pigment may be an azo pigment such as a monoazo-based pigment and a disazo-based pigment, a condensed polycyclic pigment such as a phthalocyanine pigment, a perylene pigment, a perinone pigment, and an anthraquinone pigment, a lake pigment such as a dye lake pigment, a fluorescent pigment, and the like. The average particle size of the pigment according to the dynamic light scattering method can be, for example, approximately 30 to 2000 nm. The color material added to the ink 36 may be one type, or two or more types. The content of the color material in the ink 36 can be, for example, approximately from 1.5 to 6 mass %.

Note that the ink 36 may include additives such as a dispersant, a surfactant also referred to as a leveling agent, a polymerization inhibitor, a polymerization accelerator, a permeation enhancer, a wetting agent, and the like, as necessary.

The irradiation unit 40 illustrated in FIG. 2 includes the plurality of irradiation parts 41 arranged in the irradiation part arrangement direction D5 at a predetermined interval, that is, pitch, in the light-emitting surface 40*a*. The number of irradiation parts 41 is smaller than the number of nozzles 34 included in one nozzle row 33. Thus, the pitch between the irradiation parts 41 in the irradiation unit 40 is greater than the pitch between the nozzles 34 in the nozzle row 33. The irradiation part arrangement direction D5, which matches the nozzle arrangement direction D4 in FIG. 2, may not match the nozzle arrangement direction D4 as long as the irradiation part arrangement direction D5 crosses the scanning direction D1. Each of the irradiation parts 41 irradiates the recording medium ME0 with UV that is the light LT1 curing the ink 36, under the control by the light amount control unit 15 illustrated in FIG. 1. The light amount control unit 15 can change the irradiation intensity of the light LT1, by changing current flowing in the irradiation parts 41, for example.

When direct current is supplied to the irradiation parts 41, the light amount control unit 15 can change the irradiation intensity of the light LT1, by changing a current value of the direct current. Thus, the light amount control unit 15 sets the current value described above to "large" to set the irradiation intensity of the light LT1 to high, sets the current value described above to "medium" smaller than "large" to set the irradiation intensity of the light LT1 to medium, and sets the current value described above to "small" smaller than "medium" to set the irradiation intensity of the light LT1 to low. Logically, the light amount control unit 15 may set the current value described above to "0" smaller than "small" to turn OFF the irradiation parts 41.

When pulsed current is supplied to the irradiation parts 41, the light amount control unit 15 can change the irradiation intensity of the light LT1, by changing a pulse width in which the pulse current flows. Thus, the light amount control unit 15 sets the pulse width described above to "large" to set the irradiation intensity of the light LT1 to high, sets the pulse width described above to "medium" smaller than "large" to set the irradiation intensity of the light LT1 to medium, and sets the pulse width described above to "small" smaller than "medium" to set the irradiation intensity of the light LT1 to low. Logically, the light amount control unit 15 may set the pulse width described above to "0" smaller than "small" to turn OFF the irradiation parts 41.

As an example, with the recording device 1 illustrated in FIG. 3, the ink droplets 37 land on the recording medium ME0 in units of bands B0, and the recording medium ME0 is irradiated with the light LT1 in units of the bands B0. Specifically, a band B1, a band B2, a band B3, . . . have the image IM0 formed by the ink droplets 37 and are irradiated with the light LT1 in this order in the sub scanning direction D2. The sub scanning direction D2 is a direction opposite to the send direction D3, and is a direction in which the recording head 30 moves relative to the recording medium ME0 during the sub scanning. The sub scanning direction D2 is a direction crossing the scanning direction D1, and is a direction orthogonal to the scanning direction D1, for example.

The irradiation unit 40 illustrated in FIG. 3 is positioned further in the backward direction D12 than the recording head 30. In this case, in the recording device 1, the irradiation unit 40 may irradiate the band B0 with the light LT1 while the recording head 30 discharges the ink droplets 37 onto the band B0, during the main scanning in which the carriage 52 moves in the forward direction D11. When the ink droplets 37 land on the band B0, dots DT0 of the ink droplets 37 are formed. The dots DT0 formed on the band B0, that is, the ink droplets 37 cure upon being irradiated with the light LT1. As a result, the pattern of the dots DT0 cured is formed as the image IM0 on the band B0.

The recording device 1 may set the irradiation intensity of the light LT1 to low while the carriage 52 moves in the forward direction D11 during the main scanning, to temporarily cure the dots DT0. Then, the recording device 1 may set the irradiation intensity of the light LT1 to high while the carriage 52 moves in the backward direction D12 during the main scanning, to fully cure the ink droplets 37.

When the recording device 1 forms the pattern of the dots DT0 cured on the band B1, the controller 10 makes the roller drive unit 55 convey the recording medium ME0 in accordance with the position of the band B1 in the send direction D3. After the recording medium ME0 has been thus sent, the controller 10 makes the carriage drive unit 51 move the carriage 52 in the forward direction D11, makes the recording head 30 discharge the ink droplets 37 onto the band B1, and makes the irradiation unit 40 irradiate the band B1 with the light LT1. Then, the controller 10 makes the carriage drive unit 51 move the carriage 52 in the backward direction D12, and makes the irradiation unit 40 irradiate the band B1 with the light LT1 as necessary.

When the pattern of the dots DT0 cured is formed in the band B1, the controller 10 makes the roller drive unit 55 convey the recording medium ME0 in accordance with the position of the band B2 in the sub scanning direction D2. The amount of the recording medium ME0 sent at this time corresponds to the length of the band B0 in the sub scanning direction D2. When the ink droplets 37 are not discharged from the recording head 30, the conveyance of the recording medium ME0 in the send direction D3 and the movement of the carriage 52 in the scanning direction D1 may be performed concurrently. After the recording medium ME0 has been thus sent, the controller 10 makes the carriage drive unit 51 move the carriage 52 in the forward direction D11, makes the recording head 30 discharge the ink droplets 37 onto the band B2, and makes the irradiation unit 40 irradiate the band B2 with the light LT1. Then, the controller 10 makes the carriage drive unit 51 move the carriage 52 in the backward direction D12, and makes the irradiation unit 40 irradiate the band B2 with the light LT1 as necessary.

Then, the controller 10 repeats a series of control for making the roller drive unit 55 convey the recording medium ME0 by the length of the band B0 and performing the combination of the main scanning in the forward direction D11 and the main scanning in the backward direction D12. As a result, the image IM0 that is the pattern of the dots DT0 cured is formed over the entirety of the recording range AR1 of the recording medium ME0.

Note that the discharging of the ink droplets and the UV irradiation are different concepts. In existing printers, a mechanism for transferring print data has been standardized, but there has been no mechanism for transferring the UV irradiation range. Thus, with existing printers, the UV irradiation range is fixedly controlled on the printer side. As a result, in existing printers, the following may occur.

A. When the UV irradiation range is insufficient, the ink may remain uncured.

B. Increase in the UV irradiation range for the sake of avoiding the ink curing failure results in wasteful power consumption.

C. To prevent the wasteful power consumption, complicated control taking into consideration a difference in height between the nozzle discharging ink droplets and the UV irradiation part is required, resulting in a printer with a higher cost. D. To simplify the control and avoid the ink curing failure, a pass for UV irradiation is required, resulting in a delay in printing.

E. Image quality might be compromised due to variation in curing characteristics among different types of ink.

F. When the different types of ink are adjusted to have the same curing characteristics, a larger amount of organic solvent is required, resulting in a higher ink cost.

G. The impact described above increases as the level of complication of the recording increases, to hinder improvement in image quality.

H. The ink might not be curable to a degree desired by the user.

In the present specific example, the host device HO1 generates the irradiation range data DA3 indicating the irradiation range AR0 of the light LT1 for curing the ink droplets 37. The recording device 1 irradiates the recording medium ME0 with the light LT1 in accordance with the irradiation range AR0, based on the irradiation range data DA3. Thus, with the present specific example, a degree of freedom in terms of irradiation with the light LT1 for curing the ink droplets 37 is improved.

In the present specific example, as illustrated in a lower part of FIG. 2, the resolution of the irradiation range data DA3 is set to match the resolution of the image data DA2, with the plurality of irradiation parts 41 regarded as the virtual UV nozzle row 43. In the UV nozzle row 43, virtual UV nozzles 44 are assumed to be arranged in the nozzle arrangement direction D4 at a predetermined interval, that is, a nozzle pitch.

With the present specific example described above, no system is required for a dedicated control command used by the host device HO1 to notify the recording device 1 of the irradiation range AR0 of the light LT1.

The host device HO1 illustrated in FIG. 4 generates the recording data DA1 including the irradiation range data DA3 in addition to the image data DA2, and transmits the recording data DA1 to the recording device 1, to set the irradiation range AR0 illustrated in FIG. 5.

The host device HO1 includes a CPU 101 that is a processor, a ROM 102 that is a semiconductor memory, a RAM 103 that is a semiconductor memory, a storage device 104, an input device 105, a display device 106, an I/F 107, and the like. These elements are electrically coupled to each other so that information can be input and output therebetween.

The storage device 104 stores an OS not illustrated, a driver program implementing a driver layer LA2, an application program implementing an application layer LA1, and the like. OS is an abbreviation for operating system. The driver program is a control program for controlling the recording device 1, and may be referred to as a printer driver. The storage device 104 is a computer-readable medium in which the control program is recorded. The control program may be recorded in a computer readable external recording medium. The control program provides the host device HO1 with a function of controlling the recording device 1. The CPU 101 executes the control program loaded onto the RAM 103 from the storage device 104, to execute processing of controlling the recording device 1.

The input device 105 may be a pointing device, a hard key including a keyboard, a touch panel attached to a surface of a display panel, or the like. The display device 106 may be a liquid crystal display panel or the like. The I/F 107 is coupled to the communication I/F 22 of the recording device 1, and performs communications conforming to a predetermined communication standard, with the communication I/F 22. For example, the host device HO1 transmits command data DA0 and the like to the recording device 1 through the I/F 107.

The driver layer LA2 receives the original image data DA5 and the irradiation range data DA3 from the application layer LA1, to generate the command data DA0 including the recording data DA1 and transmit the command data DA0 to the recording device 1.

As illustrated in FIG. 5, the original image data DA5 includes the plurality of pixels PX1, and each pixel PX1 has a pixel value V5 of multiple gradations, for example, 256 gradations. The pixel value V5 indicates the used amount of the ink 36 serving as the ink droplets 37, and is expressed by an integer value of, for example, 0 to 255. In other words, the original image data DA5 indicates the used amount of the ink 36 in units of the pixels PX1, and expresses the color image IM0 formed in the recording medium ME0 using the pixel value V5 of each of the pixels PX1. For example, the original image data DA5 includes original image data indicating an image of the color C, original image data indicating an image of the color M, original image data indicating an image of the color Y, and original image data indicating an image of the color K. In this case, a larger pixel value V5 corresponds to a larger used amount of the ink 36. The application layer LA1 generates the original image data DA5 in response to an operation by the user and transfers the original image data DA5 to the driver layer LA2.

The irradiation range data DA3 includes the plurality of pixels PX1 of the same resolution as the original image data DA5, with each of the pixels PX1 having the pixel value V3 of four gradations, for example. The pixel value V3 is an example of the irradiation state information indicating the irradiation state of the light LT1, and is expressed by an integer value of, for example, 0 to 3. When the pixel value V3 is of four gradations, for example, V3=0 indicates OFF, V3=1 indicates low irradiation intensity, V3=2 indicates medium irradiation intensity, and V3=3 indicates high irradiation intensity. Note that the pixel value V3 of the irradiation range data DA3 combined with the original image data DA5 may be of multiple gradations that is the same as those of the pixel value V5 of the original image data DA5, and thus may be 256 gradations or two gradations, for example. When the pixel value V3 is of two gradations, for example, V3=0 indicates OFF, and V3=1 indicates ON. The application layer LA1 sets the irradiation range AR0 of the light LT1 in response to an operation by the user to generate the irradiation range data DA3, and transfers the irradiation range data DA3 to the driver layer LA2. The application layer LA1 sets a range wider by a predetermined amount than a region where the ink 36 is used in the original image data DA5, to the irradiation range AR0. The application layer LA1 may receive an operation of setting or changing the irradiation range AR0 from the user, and set the irradiation range AR0 in accordance with the received operation.

The driver layer LA2 receives the original image data DA5 and the irradiation range data DA3 from the application layer LA1. The driver layer LA2 generates the image data DA2 indicating the pattern of the dots DT0 from the original image data DA5, and combines the image data DA2 with the irradiation range data DA3 to generate the recording data DA1.

The image data DA2 includes the plurality of pixels PX1, with each of the pixels PX1 having a pixel value V2 of four gradations, for example. The arrangement of the plurality of pixels PX1 in the image data DA2 in the sub scanning direction D2, that is, the send direction D3, corresponds to the arrangement of the plurality of nozzles 34 in the nozzle row 33. The pixel value V2 indicates a formed state of the dots DT0 generated from the ink droplets 37, and is expressed by an integer value of, for example, 0 to 3. When the pixel value V2 is of four gradations, for example, V2=0 indicates no dot, V2=1 indicates small dot formation, V2=2 indicates medium-sized dot formation, and V2=3 indicates large dot formation. When the pixel value V2 is of two gradations, for example, V2=0 indicates no dot, and V2=1 indicates dot formation. Thus, the image data DA2 expresses the formed state of the dots DT0 in units of the pixels PX1, and provides the recording medium ME0 with a pattern of the dots DT0 corresponding to the image IM0. For example, the image data DA2 includes image data indicating an image of the color C, image data indicating an image of the color M, image data indicating an image of the color Y, and image data indicating an image of the color K. Thus, the image data DA2 expresses the color image IM0 formed, using the pixel value V2 of each of the pixels PX1. The driver layer LA2 generates the image data DA2 by executing the halftone processing to reduce the number of gradations from that of the original image data DA5.

The original image data DA5 and the image data DA2 may have different resolutions. In this case, the driver layer LA2 may convert the resolution of the original image data DA5 in accordance with the resolution of the image data DA2.

The irradiation range data DA3 includes the plurality of pixels PX1 having the same resolution as the image data DA2, and has the pixel value V3 indicating the irradiation state of the light LT1 in units of the pixels PX1. The arrangement of the plurality of pixels PX1 in the irradiation range data DA3 in the sub scanning direction D2, that is, the send direction D3, corresponds to the arrangement of the plurality UV nozzles 44 in the virtual UV nozzle row 43 illustrated in FIG. 2. When the pixel value V3 is of four gradations, for example, V3=0 indicates OFF, V3=1 indicates low irradiation intensity, V3=2 indicates medium irradiation intensity, and V3=3 indicates high irradiation intensity. In this case, the irradiation range data DA3 expresses the irradiation intensity of the light LT1 using the pixel value V3, in units of the pixels PX1, in addition to the irradiation range AR0.

The irradiation range data DA3 in the application layer LA1 and the irradiation range data DA3 in the driver layer LA2 may have different numbers of gradations of the pixel value V3. In this case, the driver layer LA2 may execute the halftone processing to reduce the number of gradations on the irradiation range data DA3 received from the application layer LA1.

The irradiation range data DA3 in the application layer LA1 and the irradiation range data DA3 in the driver layer LA2 may have different resolutions. In this case, the driver layer LA2 may convert the resolution of the irradiation range data DA3 received from the application layer LA1.

The driver layer LA2 illustrated in FIG. 4 generates the command data DA0 for making the recording device 1 perform recording, based on the recording data DA1 obtained as the combination of the image data DA2 and the irradiation range data DA3. The driver layer LA2 allocates, to the command data DA0, the nozzle data for each of C, M, Y, and K from the image data DA2, and allocates UV nozzle data from the irradiation range data DA3, in accordance with the position of each band B0. As illustrated in FIG. 4, a pass 1 for performing recording on the band B1 is allocated with the CMYK nozzle data and the UV nozzle data, a pass 2 for performing recording on the band B2 is allocated with the CMYK nozzle data and the UV nozzle data, and passes thereafter are allocated with the CMYK nozzle data and the UV nozzle data. In this manner, the driver layer LA2 generates the command data DA0 including the image data DA2 and the irradiation range data DA3, and transmits the command data DA0 to the recording device 1.

The communication I/F 22 of the recording device 1 receives the command data DA0 from the host device HO1, and stores the command data DA0 in the RAM 21 serving as a buffer.

The image processing unit 12 of the controller 10 outputs the image data DA2 in units of the bands B0 to the drive signal transmission unit 14. The drive signal transmission unit 14 generates the drive signal SG1 from the image data DA2 and outputs the drive signal SG1 to the drive circuit 31 of the recording head 30.

The image processing unit 12 of the controller 10 generates the lighting control data DA4 by lowering the resolution of the irradiation range data DA3 stored in the RAM 21 in accordance with the arrangement of the plurality of irradiation parts 41, and outputs the lighting control data DA4 to the light amount control unit 15. The resolution of the lighting control data DA4 in the sub scanning direction D2, that is, the send direction D3, corresponds to the pitch between the irradiation parts 41, and is lower than the resolution of the irradiation range data DA3. The resolution of the lighting control data DA4 in the scanning direction D1 is set to conform to the speed of turning ON and OFF the irradiation parts 41 during the main scanning, and is lower than the resolution of the irradiation range data DA3.

As illustrated in FIG. 5, the lighting control data DA4 includes a plurality of pixels PX2 that are less than the plurality of pixels PX1 in the irradiation range data DA3, with each of the pixels PX2 having a pixel value V4 of four gradations, for example. The pixel value V4 is an example of the irradiation state information indicating the irradiation state of the light LT1 in units of the irradiation parts 41, and is expressed by an integer value of, for example, 0 to 3. The arrangement of the plurality of pixels PX2 in the lighting control data DA4 in the sub scanning direction D2, that is, the send direction D3, corresponds to the arrangement of the plurality of irradiation parts 41 in the irradiation unit 40 illustrated in FIG. 2. When the pixel value V4 is of four gradations, for example, V4=0 indicates that the corresponding irradiation part 41 is OFF, V4=1 indicates that the irradiation intensity of the corresponding irradiation part 41 is low, V4=2 indicates that the irradiation intensity of the corresponding irradiation part 41 is medium, and V4=3 indicates that the irradiation intensity of the corresponding irradiation part 41 is high. In this case, the lighting control data DA4 indicates the irradiation intensity of the light LT1 in units of the pixels PX2, using the pixel value V4. When the pixel value V4 is of two gradations, for example, V4=0 indicates that the corresponding irradiation part 41 is OFF, and V4=1 indicates the corresponding irradiation part 41 is ON.

The controller 10 generates the lighting control data DA4 converted from the irradiation range data DA3 in accordance with the positions of the plurality of irradiation parts 41, based on the irradiation range data DA3 including the plurality of pixels PX1.

The conversion method from the irradiation range data DA3 to the lighting control data DA4 is not particularly limited, and can be performed as follows, for example.

The number of pixels PX1 corresponding to each of the pixels PX2 of the lighting control data DA4 is defined as Npx1. The controller 10 can set a target pixel in the plurality of pixels PX2 included in the lighting control data DA4, and set the pixel value V4 of the target pixel to be the largest one of the pixel values V3 of the Npx1 pixels PX1 corresponding to the target pixel. When the pixel value V4 is of two gradations, the controller 10 can set the pixel value V4 of the target pixel to 1, when the pixel value V3=1 indicating ON is stored for any of the Npx1 pixels PX1 corresponding to the target pixel. In this case, the controller 10 can set the pixel value V4 of the target pixel to 0, when the pixel value V3=0 indicating OFF is stored for all of the Npx1 pixels PX1 corresponding to the target pixel.

The light amount control unit 15 of the controller 10 controls the ON timing and the OFF timing for each of the plurality of irradiation parts 41, to irradiate the recording medium ME0 with the light LT1 of the irradiation intensity corresponding to the pixel value V4 in accordance with the irradiation range AR0, based on the lighting control data DA4.

FIG. 6 schematically illustrates an example of how the light amount control unit 15 drives the irradiation parts 41 during the main scanning in the forward direction D11. During the main scanning in the forward direction D11, the controller 10 makes the recording head 30 discharge the ink droplets 37 from the nozzle rows 33C, 33M, 33Y, 33K toward the recording medium ME0 on the platen 58. Once the ink droplets 37 land on the recording medium ME0, they turn into the dots DT0.

A timing t1 indicates an example where the light amount control unit 15 controls the irradiation parts 41, when the pixel value V4 of the lighting control data DA4 is 0. In this case, the light amount control unit 15 turns OFF the irradiation parts 41.

Another timing t2 indicates an example where the light amount control unit 15 controls the irradiation parts 41, when the pixel value V4 of the lighting control data DA4 is 1. In this case, the light amount control unit 15 makes the irradiation parts 41 irradiate the recording medium ME0 with the light LT1 of low irradiation intensity. A timing at which the pixel value V4 of the pixel PX2 to which the control is applied during the main scanning changes from 0 to 1 or greater is the ON timing. A timing at which the pixel value V4 of the pixel PX2 to which the control is applied during the main scanning changes from 1 or greater to 0 is the OFF timing.

Another timing t3 indicates an example where the light amount control unit 15 controls the irradiation parts 41, when the pixel value V4 of the lighting control data DA4 is 2. In this case, the light amount control unit 15 makes the irradiation parts 41 irradiate the recording medium ME0 with the light LT1 of medium irradiation intensity.

Another timing t4 indicates an example where the light amount control unit 15 controls the irradiation parts 41, when the pixel value V4 of the lighting control data DA4 is 3. In this case, the light amount control unit 15 makes the irradiation parts 41 irradiate the recording medium ME0 with the light LT1 of high irradiation intensity.

(3) Specific Example of Processing Executed by Recording Device

Figure 7:
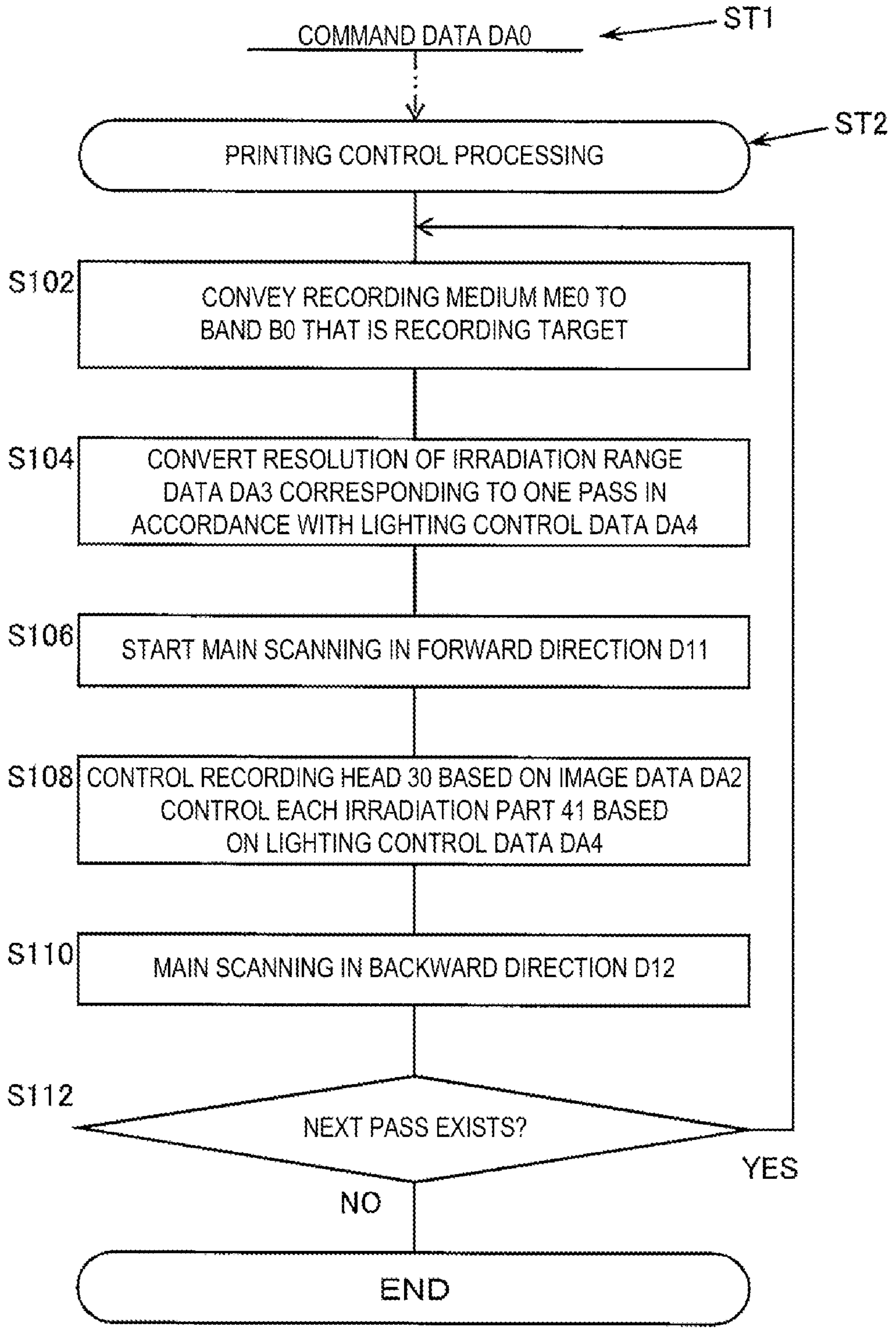
FIG. 7 is a flowchart schematically illustrating an example of printing control processing.

FIG. 7 schematically illustrates an example of printing control processing executed by the controller 10 illustrated in FIG. 1. The printing control processing illustrated in FIG. 7 starts when the communication I/F 22 receives the command data DA0 from the host device HO1. Thus, this reception of the command data DA0 corresponds to the reception step ST1 of receiving the input of the irradiation range data DA3. Furthermore, steps S102 to S112 correspond to the irradiation step ST2 of turning ON and OFF the plurality of irradiation parts 41. In the following description, the word "step" is omitted, and a reference numeral corresponding to a step may be written in parentheses.

When the printing control processing starts, the controller 10 makes the roller drive unit 55 convey the recording medium ME0 in accordance with the position of the band B0 that is the recording target in the send direction D3 (S102). Next, the controller 10 makes the image processing unit 12 convert the resolution of the irradiation range data DA3 corresponding to one pass, in accordance with the lighting control data DA4 based on the arrangement of the plurality of irradiation parts 41 (S104).

Then, the controller 10 starts the main scanning in the forward direction D11 (S106). When the main scanning in the forward direction D11 starts, the controller 10 controls the discharging of the ink droplets by the recording head 30 based on the image data DA2 corresponding to one pass, and controls turning ON and OFF of the plurality of irradiation parts 41 in accordance with the lighting control data DA4 corresponding to one pass (S108). In S108, the nozzle row 33 discharges onto the recording medium ME0, the ink droplets 37 to be cured by irradiation with the light LT1 for forming the pattern of the dots DT0, indicated by the image data DA2, on the band B0. In S108, the plurality of irradiation parts 41 are turned ON or OFF based on the lighting control data DA4, to irradiate the recording medium ME0 with the light LT1 with the irradiation intensity indicated by the lighting control data DA4 while the irradiation parts 41 are ON. As a result, the ink droplets 37 having landed on the recording medium ME0 are cured, whereby the pattern of the dots DT0 cured is formed on the band B0.

As described above, when the plurality of irradiation parts 41 and the recording medium ME0 move relatively to each other in the scanning direction D1, the controller 10 may control the ON timing and the OFF timing of each of the plurality of irradiation parts 41, to irradiate the recording medium ME0 with the light LT1 in accordance with the irradiation range AR0, based on the irradiation range data DA3. The controller 10 controls the intensity of the light LT1 with which the storage medium is irradiated by the plurality of irradiation parts 41, based on the irradiation intensity indicated by the irradiation range data DA3.

When the main scanning in the forward direction D11 ends, the controller 10 executes the main scanning in the backward direction D12 (S110). During the main scanning in the backward direction D12, the controller 10 may turn OFF all the irradiation parts 41, or may turn ON the plurality of irradiation parts 41 in the irradiation range AR0 based on the lighting control data DA4.

The controller 10 repeats the processing in S102 to S110 when there is data on the next pass in the command data DA0, and ends the printing control processing when there is no data on the next pass in the command data DA0.

As described above, the controller 10 controls the operation of the drive unit 50 and the discharging of the ink droplets 37 by the recording head 30 to form the pattern of the dots DT0 indicated by the image data DA2 on the recording medium ME0 based on the image data DA2. The controller 10 controls turning ON and OFF of the plurality of irradiation parts 41, to irradiate the recording medium ME0 with the light LT1 in accordance with the irradiation range AR0, based on the irradiation range data DA3.

In the present specific example, the recording medium ME0 is irradiated with the light LT1 in accordance with the irradiation range AR0, with the plurality of irradiation parts 41 turned ON and OFF based on the irradiation range data DA3 indicating the irradiation range AR0 of the light LT1. The light LT1 with which the storage medium is irradiated by the plurality of irradiation parts 41 has an intensity based on the irradiation intensity indicated by the irradiation range data DA3. The user can freely set the irradiation range AR0 in the application layer LA1, by using the host device HO1. This provides various advantages. With the present specific example, no system is required for a dedicated control command used by the host device HO1 to notify the recording device 1 of the irradiation range AR0 of the light LT1. With the present specific example, the irradiation range AR0 is treated as the virtual UV nozzle row 43, so that the formation of the pattern of the dots DT0 and the emission of the light LT1 from each irradiation part 41 can be synchronized using an existing control command system.

Thus, with the present specific example, a degree of freedom in terms of irradiation with the light LT1 for curing the ink droplets 37 can be improved.

Furthermore, the present technique enables the timing of irradiation of the irradiation range AR0 with the light LT1 and the level of the irradiation intensity of the light LT1 to be set, and thus can be applied to various applications examples of which are described below.

A. Whether UV irradiation is performed for a pass without an image is selected.

B. A UV irradiation range is widened or narrowed based on the discharge amount and ratio of each ink.

C. The ink droplets are discharged from the recording head again before the ink droplets having landed on the recording medium are not cured, and the overlapped ink droplets are irradiated with the UV to be cured.

D. For the entire one page of the recording medium, only the UV irradiation is performed without discharging the ink droplets from the recording head, or the ink droplets are discharged from the recording head onto the recording medium without performing the UV irradiation. For example, for the entire one page of the recording medium, the ink droplets are discharged from the recording head onto the recording medium without performing the UV irradiation, a film is placed on the recording medium, and then the ink droplets are cured.

E. The UV irradiation intensity is controlled with the irradiation intensity lowered when the ink density is low, and with the irradiation intensity raised when the ink density is high. For example, when some of the plurality of irradiation parts fails, a countermeasure is taken including performing the irradiation using the irradiation parts not under the failure, and raising the irradiation intensity of the irradiation parts not under the failure.

F. A plurality of types of UV lamps with different wavelength characteristics are combined to each have appropriate illuminance.

(4) Modified Examples

Within the scope of the invention, various modified examples are conceivable.

For example, the recording device to which the present technique is applicable is not limited to a serial type recording device in which the recording head 30 and the irradiation unit 40 move back and forth along the scanning direction D1, and may be a line type recording device having the recording head 30 and the irradiation unit 40 provided over the entire width of the recording medium ME0, or the like.

The combination between the ink colors is not limited to C, M, Y, and K, and may include white, orange, green, colorless, light cyan with a lower density than C, light magenta with a lower density than M, dark yellow with a higher density than Y, light black with a lower density than K, and the like. It is a matter of course that the present technique is applicable to the recording device 1 that does not use ink of one or more of C, M, Y, and K.

In the embodiment described above, the recording head 30 moves in the scanning direction D1 without moving the recording medium ME0 during the main scanning. However, this should not be construed in a limiting sense. During the main scanning, the recording medium ME0 may move in the scanning direction D1 without moving the recording head 30, or the recording head 30 and the recording medium ME0 may both move in the scanning direction D1.

In the embodiment described above, the recording medium ME0 moves in the sub scanning direction D2 without moving the recording head 30 during the sub scanning. However, this should not be construed in a limiting sense. During the sub scanning, the recording head 30 may move in the sub scanning direction D2 without moving the recording medium ME0, or the recording medium ME0 and the recording head 30 may both move in the sub scanning direction D2.

The printing on the recording medium ME0 is not limited to the printing in the units of the bands B0 as illustrated in FIG. 3, as long as the control is performed to irradiate the ink droplets 37 having landed on the recording medium ME0 with the light LT1.

The image data DA2 received by the recording device 1 from the host device HO1 is not limited to the halftone data indicating the formed state of the dots DT0, and may be multi-gradation data indicating the used amount of the ink 36 or the like. When the image data DA2 received from the host device HO1 is the multi-gradation data, the recording device 1 may generate the image data indicating the formed state of the dots DT0 by executing the halftone processing of reducing the number of gradations on the multi-gradation data, to control the discharging of the ink droplets 37.

The plurality of pixels in the irradiation range data DA3 received by the recording device 1 from the host device HO1 may correspond to the arrangement of the plurality of irradiation parts 41. In this case, the recording device 1 may control turning ON and OFF of the plurality of irradiation parts 41, with the irradiation range data DA3 used as the lighting control data DA4.

As illustrated as an example in FIG. 8 and FIG. 9, processing may be executed to switch between first setting MD1 with which the plurality of irradiation parts 41 are turned ON and OFF in accordance with the irradiation range AR0, and second setting MD2 with which an entire recording range AR1 of the recording medium ME0 is irradiated with the light LT1. FIG. 8 schematically illustrates an example of command data transmission processing executed by the host device HO1 illustrated in FIG. 1 and FIG. 4. The command data transmission processing starts when the user starts the application layer LA1 that issues an instruction to the driver layer LA2. FIG. 9 schematically illustrates an example of printing control processing executed by the controller 10 of the recording device 1 illustrated in FIG. 1. The processing illustrated in FIG. 9 is obtained by adding S302 to S304 to the processing illustrated in FIG. 7.

In the example illustrated in FIG. 8 and FIG. 9, an irradiation mode indicating irradiation setting of the plurality of irradiation parts 41 includes a UV image use mode that is the first setting MD1 and an entire irradiation mode that is the second setting MD2. The irradiation mode may include third setting and the like different from the first setting MD1 and the second setting MD2. The description below is given by also referring to FIG. 4 and FIG. 5 as appropriate.

When the command data transmission processing starts, the driver layer LA2 of the host device HO1 receives a user operation or an instruction from the application layer LA1, indicating which of the UV image use mode or the entire irradiation mode is employed as the irradiation mode (S202). The application layer LA1 of the host device HO1 receives a user operation, and generates the original image data DA5 illustrated in FIG. 4 and FIG. 5 (S204). The application layer LA1 determines whether the irradiation mode is the UV image use mode (S206), generates the irradiation range data DA3 when the irradiation mode is the UV image use mode (S208), and advances the processing to S210. In S208, the application layer LA1 may generate the irradiation range data DA3 upon receiving the user operation, and may generate the irradiation range data DA3 to form the pattern of the dots DT0 cured on the recording medium ME0 based on the original image data DA5. When the irradiation mode is the entire irradiation mode, the application layer LA1 advances the processing to S210.

In S210, the application layer LA1 transfers the original image data DA5 and the irradiation range data DA3 to the driver layer LA2, and the driver layer LA2 generates the image data DA2 based on the original image data DA5. As described above, the driver layer LA2 can generate the image data DA2 by executing the halftone processing to reduce the number of gradations from that of the original image data DA5. After the image data DA2 has been generated, the driver layer LA2 generates the command data DA0 including information indicating the irradiation mode in addition to the recording data DA1 including the image data DA2 and the irradiation range data DA3 (S212). After the command data DA0 has been generated, the driver layer LA2 transmits the command data DA0 to the recording device 1 (S214), and ends the command data transmission processing.

The printing control processing illustrated in FIG. 9 starts when the communication I/F 22 receives the command data DA0 including the information indicating the irradiation mode from the host device HO1. Thus, the communication I/F 22 that receives the command data DA0 including the information indicating the irradiation mode is an example of the reception unit that receives one of the first setting MD1 and the second setting MD2.

When the printing control processing starts, the controller 10 makes the roller drive unit 55 convey the recording medium ME0 in accordance with the position of the band B0 that is the recording target in the send direction D3 (S102). Next, the controller 10 determines whether the irradiation mode is the UV image use mode (S302). The controller 10 advances the processing to S104 when the irradiation mode is the UV image use mode, to make the image processing unit 12 convert the resolution of the irradiation range data DA3 corresponding to one pass, in accordance with the lighting control data DA4 based on the arrangement of the plurality of irradiation parts 41. On the other hand, when the irradiation mode is the entire irradiation mode, the controller 10 advances the processing to S304, and makes the image processing unit 12 generate the lighting control data DA4 to constantly turn ON all the irradiation parts 41. This lighting control data DA4 is data with which the entire recording range AR1 of the recording medium ME0 is irradiated with the light LT1. When the pixel value V4 of the lighting control data DA4 is four-valued data, the controller 10 may set the pixel value V4 to 3, indicating high irradiation intensity.

After the processing in S104 or S304, the controller 10 starts the main scanning in the forward direction D11 (S106). When the main scanning in the forward direction D11 starts, the controller 10 controls the discharging of the ink droplets by the recording head 30 based on the image data DA2 corresponding to one pass, and controls turning ON and OFF of the plurality of irradiation parts 41 in accordance with the lighting control data DA4 corresponding to one pass (S108). When the main scanning in the forward direction D11 ends, the controller 10 executes the main scanning in the backward direction D12 (S110). The controller 10 returns the processing to S102 when there is data on the next pass in the command data DA0, and ends the printing control processing when there is no data on the next pass in the command data DA0 (S112).

As described above, when the UV image use mode is received, the controller 10 controls turning ON and OFF of the plurality of irradiation parts 41, to irradiate the recording medium ME0 with the light LT1 in accordance with the irradiation range AR0, based on the irradiation range data DA3. When the entire irradiation mode is received, the controller 10 performs control to turn ON the plurality of irradiation parts 41, to irradiate the entire recording range AR1 of the recording medium ME0 with the light LT1.

In the example illustrated in FIG. 8 and FIG. 9, whether the plurality of irradiation parts 41 are turned ON and OFF in accordance with the irradiation range AR0, or the entire recording range AR1 of the recording medium ME0 is irradiated with the light LT1 can be selected. Thus, the example illustrated in FIG. 8 and FIG. 9 can improve usability.

When the irradiation range data generation processing in S208 illustrated in FIG. 8 is automatically performed based on the original image data DA5, the user can easily set the irradiation range AR0 of the light LT1 using the host device HO1. The preferable examples will be described below.

Figure 10:
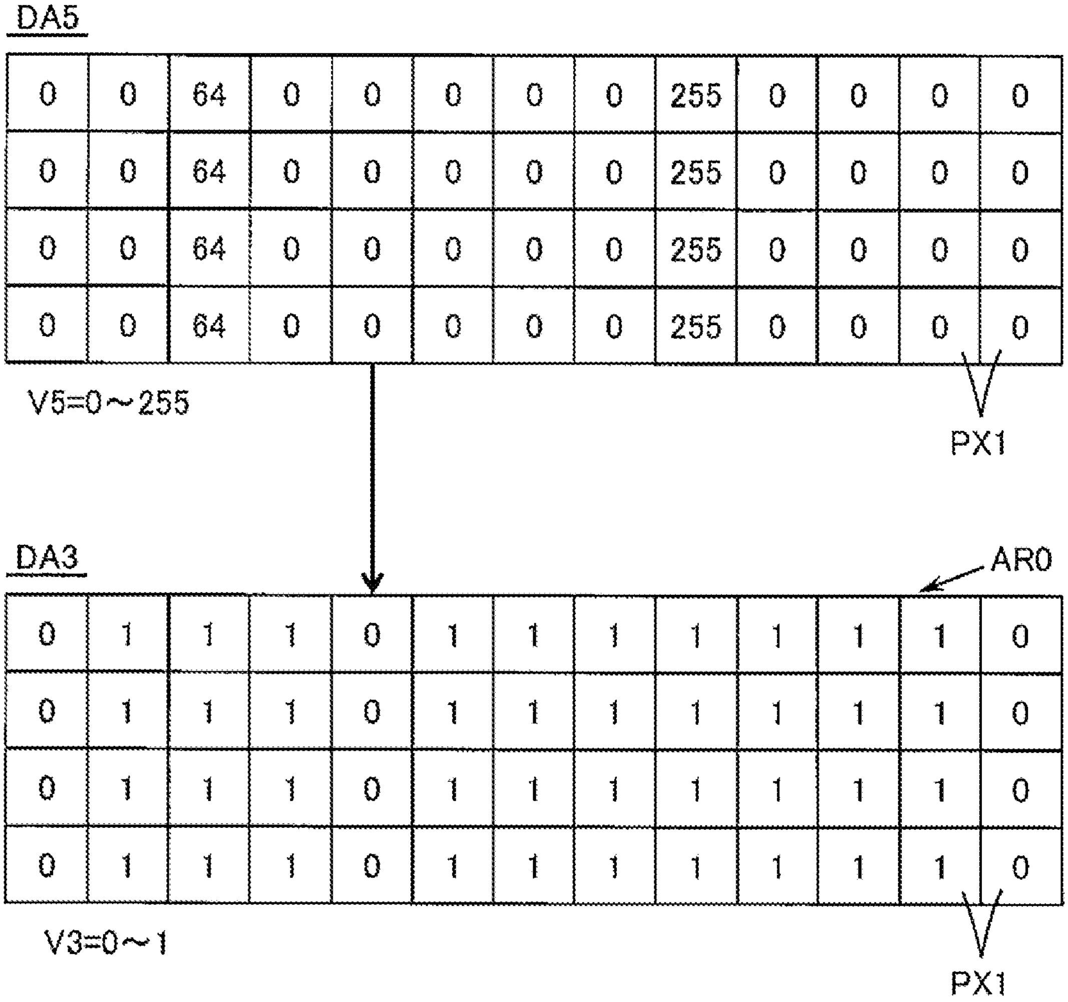
FIG. 10 is a diagram schematically illustrating an example where an irradiation range is changed in accordance with an amount of ink used.

FIG. 10 schematically illustrates an example in which the host device HO1 changes the irradiation range AR0 in accordance with the used amount of the ink 36 in the irradiation range data generation processing in S208 in FIG. 8. The processing illustrated in FIG. 10 may be executed by the application layer LA1 or the driver layer LA2.

In the original image data DA5 illustrated in FIG. 10, each of the pixels PX1 has the pixel value V5 of 0 to 255. In this case, a larger pixel value V5 is assumed to correspond to a larger used amount of the ink 36. In the original image data DA5, the pixel value V5=0 indicates a pixel for which the ink 36 is not used, the pixel value V5=255 indicates a pixel for which the largest amount of the ink 36 is used, and the pixel value V5=64 indicates a pixel the used amount of the ink 36 for which is smaller than the used amount for the pixel value V5=255. In the irradiation range data DA3 illustrated in FIG. 10, each of the pixels PX1 has the pixel value V3 of 0 or 1.

A first size of the irradiation range AR0 when the used amount of the ink 36 is a first used amount is assumed to be smaller than a second size of the irradiation range AR0 when the used amount of the ink 36 is a second used amount larger than the first used amount. For example, the pixel value V5=1 to 100 is assumed to correspond to the first used amount, the pixel value V5=201 to 255 is assumed to correspond to the second used amount, a single pixel is assumed to correspond to the first size, and three pixels are assumed to correspond to the second size. Upon acquiring the original image data DA5, the host device HO1 generates the irradiation range data DA3 indicating the irradiation range AR0 that is larger than the pixel PX1 for which the ink 36 is used in the original image data DA5 by the number of pixels corresponding to the first or the second size. The irradiation range AR0 illustrated in FIG. 10 expands outward from the pixel PX1 with the pixel value V5=64 by a single pixel, and expands outward from the pixel PX1 with the pixel value V5=255 by three pixels.

As described above, the host device HO1 generates the irradiation range data DA3 with the irradiation range AR0 changed in accordance with the used amount of the ink 36, based on the used amount of the ink 36 expressed in units of the pixels PX1. As a preferred example, the host device HO1 sets the size of the irradiation range AR0 based on the pixel the amount of the ink 36 used for which is the first used amount to be smaller than the irradiation range AR0 based on the pixel the amount of the ink 36 used for which is the second used amount.

When the controller 10 of the recording device 1 controls turning ON and OFF of the plurality of irradiation parts 41 based on the irradiation range data DA3 generated, the irradiation range AR0, varying in accordance with the used amount of the ink 36, is irradiated with the light LT1.

In the preferable example described above, in the irradiation range AR0, the size of a portion the used amount of the ink 36 for which is the first used amount, which is relatively small, is set to be smaller than the size of a portion the used amount of the ink 36 for which is the second used amount, which is relatively large. In this case, the ink droplets 37 having landed on the recording medium ME0 can be efficiently cured.

FIG. 11 schematically illustrates an example in which the host device HO1 changes the irradiation intensity of the light LT1, for example, the pixel value V3 in accordance with the used amount of the ink 36 in the irradiation range data generation processing in S208 in FIG. 8. The processing illustrated in FIG. 11 may be executed by the application layer LA1 or the driver layer LA2.

Also in the original image data DA5 illustrated in FIG. 11, each of the pixels PX1 has the pixel value V5 of 0 to 255. In this case, a larger pixel value V5 is assumed to correspond to a larger used amount of the ink 36. In the irradiation range data DA3 illustrated in FIG. 11, each of the pixels PX1 has the pixel value V3 of 0 to 3.

A first irradiation intensity when the used amount of the ink 36 is the first used amount is assumed to be lower than a second irradiation intensity when the used amount of the ink 36 is the second used amount larger than the first used amount. For example, the pixel value V5=1 to 100 is assumed to correspond to the first used amount, the pixel value V5=201 to 255 is assumed to correspond to the second used amount, V3=1 indicating low irradiation intensity is assumed to correspond to the first irradiation intensity, and V3=3 indicating high irradiation intensity is assumed to correspond to the second irradiation intensity. Upon acquiring the original image data DA5, the host device HO1 generates the irradiation range data DA3 indicating the irradiation range AR0 that is larger than the pixel PX1 for which the ink 36 is used in the original image data DA5 by a single pixel. The host device HO1 sets the pixel value V3 of the irradiation range data DA3 to 1 for a pixel with the pixel value V5 of 1 to 100, and pixels adjacent thereto. The host device HO1 sets the pixel value V3 of the irradiation range data DA3 to 3 for a pixel with the pixel value V5 of 201 to 255, and pixels adjacent thereto.

As described above, the host device HO1 generates the irradiation range data DA3 with the pixel value V3 indicating the irradiation intensity of the light LT1 changed in accordance with the used amount of the ink 36, based on the used amount of the ink 36 expressed in units of the pixels PX1. As a preferable example, the host device HO1 converts the pixel the used amount of the ink 36 for which is the first used amount into a pixel indicating the first irradiation intensity in the irradiation range data DA3, and converts the pixel the used amount of the ink 36 for which is the second used amount into a pixel indicating the second irradiation intensity in the irradiation range data DA3.

When the controller 10 of the recording device 1 controls the intensity of the light LT1 with which the storage medium is irradiated by the plurality of irradiation parts 41 based on the irradiation range data DA3 generated, the irradiation range AR0 is irradiated with the light LT1 the irradiation intensity of which varies in accordance with the used amount of the ink 36.

In the preferable example described above, in the irradiation range AR0, the irradiation intensity of a portion the used amount of the ink 36 for which is the first used amount, which is relatively small, is set to be lower than the irradiation intensity of a portion the used amount of the ink 36 for which is the second used amount, which is relatively large. In this case, the ink droplets 37 having landed on the recording medium ME0 can be efficiently cured.

The host device HO1 may combine the processing of changing the irradiation range AR0 based on the used amount of the ink 36 as illustrated in FIG. 10 and the processing of changing the irradiation intensity of the light LT1 based on the used amount of the ink 36 as illustrated in FIG. 11. For example, the host device HO1 may generate the irradiation range data DA3 based on the original image data DA5 illustrated in FIG. 10, with the pixel value V3 of a pixel with the pixel value V5 of 201 to 255, and of pixels within a range of the second size outward from such a pixel set to 3.

(5) Conclusion

As described above, various aspects of the present disclosure can provide a technique and the like of improving a degree of freedom in terms of light irradiation for curing ink droplets. Of course, even a technique including only the components recited in the independent claims produces the above-described basic advantages.

Furthermore, the aspects of the invention can implement configurations resulting from mutual replacement of components disclosed in the above-described examples or a change in the combination of the components, configurations resulting from mutual replacement of components disclosed in the known art and the above-described examples or a change in the combination of the components, and the like. The aspects of the invention include these configurations and the like.

What is claimed is:

1. A recording device comprising:

a recording head including a nozzle row configured to discharge ink droplets that are to be cured when irradiated with light onto a recording medium;

a drive unit configured to cause the recording head and the recording medium to move relative to each other;

a plurality of irradiation parts configured to irradiate the recording medium with the light;

a reception unit configured to receive an input of irradiation range data indicating an irradiation range of the light and an input of image data for obtaining a pattern of dots of the ink droplets, the irradiation range data including a plurality of pixels so as to have a resolution same as a resolution of the image data, and including irradiation state information indicating an irradiation state of the light in units of the pixels; and a control unit configured to control an operation of the drive unit and discharging of the ink droplets by the recording head, to form the pattern on the recording medium based on the image data, generate lighting control data by converting the irradiation range data in accordance with arrangement of the plurality of irradiation parts such that a resolution of the lighting control data is lower than the resolution of the irradiation range data, and control turning ON and OFF of the plurality of irradiation parts, to irradiate the recording medium with the light in accordance with the irradiation range, based on the lighting control data.

2. The recording device according to claim 1, wherein the drive unit is configured to cause the plurality of irradiation parts and the recording medium to move relative to each other in a scanning direction crossing an irradiation part arrangement direction in which the plurality of irradiation parts are arranged, and when the plurality of irradiation parts and the recording medium move relative to each other in the scanning direction, the control unit controls an ON timing and an OFF timing of each of the plurality of irradiation parts, to irradiate the recording medium with the light in accordance with the irradiation range, based on the lighting control data.

3. The recording device according to claim 2, wherein a plurality of nozzles included in the nozzle row are arranged in a nozzle arrangement direction crossing the scanning direction, and when the recording head and the recording medium move relative to each other in the scanning direction, the plurality of irradiation parts and the recording medium move relative to each other in the scanning direction.

4. The recording device according to claim 1, wherein the lighting control data indicates irradiation intensity of the light in addition to the irradiation range, and the control unit controls intensity of the light with which the recording medium is irradiated by the plurality of irradiation parts, based on the irradiation intensity indicated by the lighting control data.

5. The recording device according to claim 1, wherein the reception unit receives any one of first setting in which the plurality of irradiation parts are turned ON and OFF in accordance with the irradiation range, and second setting in which an entire recording range of the recording medium is irradiated with the light, when the first setting is received, the control unit controls turning ON and OFF of the plurality of irradiation parts, to irradiate the recording medium with the light in accordance with the irradiation range, based on the lighting control data, and when the second setting is received, the control unit performs control to turn ON the plurality of irradiation parts, to irradiate the entire recording range of the recording medium with the light.

6. A recording system comprising:

the recording device described in claim 1; and a host device configured to output the irradiation range data to the reception unit.

7. The recording system according to claim 6, wherein the host device acquires original image data including a plurality of pixels and indicating an amount of ink used to form the ink droplets in units of the pixels, and the host device generates the irradiation range data with the irradiation range changed in accordance with the used amount of the ink, based on the used amount of the ink expressed in units of the pixels.

8. The recording system according to claim 6, wherein the irradiation range data indicates irradiation intensity of the light in units of the pixels in addition to the irradiation range, the control unit controls intensity of the light with which the recording medium is irradiated by the plurality of irradiation parts, based on the irradiation intensity indicated in units of the pixels in the irradiation range data, the host device acquires original image data including the plurality of pixels and indicating an amount of ink used to form the ink droplets in units of the pixels, and the host device generates the irradiation range data with the irradiation intensity of the light changed in accordance with the used amount of the ink, based on the used amount of the ink expressed in units of the pixels.

9. A recording method using a recording device in accordance with claim 1, the recording method comprising:

receiving, at the reception unit, the input of irradiation range data, and the input of image data;

controlling, at the control unit, the operation of the drive unit and the discharging of the ink droplets by the recording head, to form the pattern on the recording medium based on the image data;

generating, at the control unit, the lighting control data by converting the irradiation range data in accordance with the arrangement of the plurality of irradiation parts such that the resolution of the lighting control data is lower than the resolution of the irradiation range data; and controlling, at the control unit, turning ON and OFF the plurality of irradiation parts, to irradiate the recording medium with the light in accordance with the irradiation range, based on the lighting control data.

* * * * *